US012482526B2

(12) United States Patent
Huang et al.

(10) Patent No.: US 12,482,526 B2
(45) Date of Patent: Nov. 25, 2025

(54) NON-VOLATILE MEMORY AND REFERENCE CURRENT GENERATOR THEREOF

(71) Applicant: eMemory Technology Inc., Hsin-Chu (TW)

(72) Inventors: Chih-Yang Huang, Hsinchu County (TW); Woan-Yun Hsiao, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 151 days.

(21) Appl. No.: 18/505,143

(22) Filed: Nov. 9, 2023

(65) Prior Publication Data
US 2024/0161814 A1    May 16, 2024

Related U.S. Application Data

(60) Provisional application No. 63/424,966, filed on Nov. 14, 2022.

(51) Int. Cl.
G11C 7/00 (2006.01)
G11C 7/06 (2006.01)
(Continued)

(52) U.S. Cl.
CPC ............. *G11C 16/26* (2013.01); *G11C 7/062* (2013.01); *G11C 7/065* (2013.01); *G11C 16/10* (2013.01);
(Continued)

(58) Field of Classification Search
CPC . G11C 16/28; G11C 11/5621; G11C 11/5642; G11C 2211/5634; G11C 5/147; G11C 16/10; G11C 11/5628; G11C 11/5635; G11C 16/16; G11C 16/3436; G11C 16/3445; G11C 16/3459; G11C 2211/5621; G11C 2211/5631; G11C 2211/5645; G11C 7/04; G11C 13/004; G11C 13/0069; G11C 16/08; G11C 7/06; G11C 7/14; G11C 8/00; G11C 11/40;
(Continued)

(56) References Cited

U.S. PATENT DOCUMENTS 6,985,383 B2 * 1/2006 Tang ..................... G11C 11/16
                                                              365/158
10,366,765 B2   7/2019 Chih et al.
(Continued)

*Primary Examiner* — Thong Q Le
(74) *Attorney, Agent, or Firm* — WPAT, PC

(57) ABSTRACT

A non-volatile memory receives a supply voltage. The non-volatile memory includes a reference current generator and a sensing circuit. The reference current generator provides a reference current to the sensing circuit. The reference current generator includes a control voltage generation circuit, a current path selecting circuit and a mirroring circuit. The control voltage generation circuit receives a control signal and generates a control voltage according to the control signal. The current path selecting circuit generates the reference current. A current input terminal of the mirroring circuit receives the reference current. If the control signal is set as a first value, the reference current is changed at a first slope in a range of the supply voltage. If the control signal is set as a second value, the reference current is changed at a second slope in the range of the supply voltage.

26 Claims, 9 Drawing Sheets

(51) Int. Cl.
*G11C 16/10* (2006.01)
*G11C 16/12* (2006.01)
*G11C 16/24* (2006.01)
*G11C 16/26* (2006.01)
*G11C 16/28* (2006.01)
*H10B 41/35* (2023.01)
*H10D 30/68* (2025.01)
*G11C 13/00* (2006.01)

(52) U.S. Cl.
CPC .............. *G11C 16/12* (2013.01); *G11C 16/24* (2013.01); *G11C 16/28* (2013.01); *H10B 41/35* (2023.02); *H10D 30/6892* (2025.01); *G11C 2013/0042* (2013.01)

(58) Field of Classification Search
CPC ..... G11C 16/26; G11C 11/41; G11C 13/0004; G11C 13/0023; G11C 13/0028; G11C 13/0033; G11C 13/0061; G11C 16/24; G11C 16/32; G11C 16/3431; G11C 2013/0042; G11C 2013/0054; G11C 2013/0083; G11C 2013/0088; G11C 2029/0411; G11C 2029/5006; G11C 2211/5641; G11C 2213/71; G11C 2213/72; G11C 29/02; G11C 29/025; G11C 29/50; G11C 29/50016; G11C 5/02; G11C 5/063; G11C 7/062; G11C 7/065; G11C 8/08; G11C 11/4074; G11C 11/4091; G11C 11/4093; G11C 11/4096; G11C 11/4099; G11C 16/12; G11C 16/14
USPC .. 365/185.03, 185.2, 208, 168, 201, 185.22, 365/156, 185.18, 185.33, 207, 104, 154, 365/174, 184, 185.21, 185.23, 185.29, 365/189.07, 189.09, 189.16, 195, 200, 365/203, 2

See application file for complete search history.

(56) References Cited

U.S. PATENT DOCUMENTS

| | | | |
|---|---|---|---|
| 10,679,697 | B2 | 6/2020 | Lei et al. |
| 10,930,346 | B1 | 2/2021 | Ryu et al. |
| 10,978,146 | B2 | 4/2021 | Pasotti et al. |
| 11,011,230 | B1 | 5/2021 | Liu et al. |
| 11,081,177 | B2 | 8/2021 | Kumar |
| 11,289,142 | B2 | 3/2022 | Tran et al. |

\* cited by examiner

NON-VOLATILE MEMORY AND REFERENCE CURRENT GENERATOR THEREOF

This application claims the benefit of U.S. provisional application Ser. No. 63/424,966, filed Nov. 14, 2022, the subject matters of which are incorporated herein by references.

FIELD OF THE INVENTION

The present invention relates to a memory and a control circuit of the memory, and more particularly to a non-volatile memory and a reference current generator of the non-volatile memory.

BACKGROUND OF THE INVENTION

As is well known, a non-volatile memory is able to continuously retain data after the supplied power is interrupted. Consequently, non-volatile memories have been widely applied to various electronic products.

Generally, a non-volatile memory comprises a memory cell array. The memory cell array comprises plural memory cells. According to the storage states of the memory cells, the stored data in the non-volatile memory can be realized.

FIG. 1 is a schematic circuit diagram illustrating a conventional non-volatile memory. As shown in FIG. 1, the non-volatile memory 100 comprises a memory module 110, a reference current generator 120 and a sensing circuit 130. The memory module 110 comprises a memory cell array 112 and a switching circuit 114. The memory cell array 112 comprises M×N memory cells, M and N are positive integers. The memory cell array 112 is connected with a source lines SL, an erase line EL, M word lines $WL_1$~$WL_M$ and N bit lines $BL_1$~$BL_N$. The switching circuit 114 is connected with the N bit lines $BL_1$~$BL_N$ and X data lines $DL_1$-$DL_X$, wherein X is a positive integer. The sensing circuit 130 is connected with the X data lines $DL_1$-$DL_X$. In addition, the sensing circuit 130 generates X data signals $D_{O1}$~$D_{OX}$. Generally, the non-volatile memory 100 may be subjected to a program action, an erase action or a read action. After the program action or the erase action is performed on the non-volatile memory 100, the storage states of specified memory cells in the memory cell array 112 are changed. When the read action is performed, the storage states of the memory cells in the memory cell array 112 can be judged.

When a read action is performed, one of the M word lines $WL_1$~$WL_M$ is activated, and a selected row of the memory cell array 112 is determined. Consequently, the N memory cells in the selected row are selected memory cells. Moreover, in plural read cycles, portions of the N bit lines $BL_1$~BL N are connected with the data lines $DL_1$-$DL_X$ through the switching circuit 114. Consequently, the sensing circuit 130 generates the data signals $D_{O1}$~$D_{OX}$.

For example, M is 1024, N is 32, and X is 16. When the read action is performed, the word line $WL_1$ is activated, and the first row of the memory cell array 112 is the selected row. Consequently, the 32 memory cells in the selected row are selected memory cells. In a first read cycle, the bit lines $BL_1$~$BL_{16}$ are respectively connected with the data lines $DL_1$~$DL_{16}$ through the switching circuit 114. Consequently, the sensing circuit 130 generates the data signals $D_{O1}$~$D_{O16}$. Then, in a second read cycle, the bit lines $BL_{17}$~$BL_{32}$ are respectively connected with the data lines $DL_1$~$DL_{16}$ through the switching circuit 114. Consequently, the sensing circuit 130 generates the data signals $D_{O1}$~$D_{O16}$. In other words, the data signals $D_{O1}$~$D_{O16}$ generated in the first read cycle represent the storage states of the first 16 selected memory cells in the selected row, and the data signals $D_{O1}$~$D_{O16}$ generated in the second read cycle represent the storage states of the last 16 selected memory cells in the selected row.

In some small-sized memory cell arrays 112, the number of the bit lines $BL_1$~$BL_N$ and the number of the data lines $DL_1$~$DL_X$ are equal. That is, N is equal to X. In this case, the switching circuit 114 can be omitted. In addition, the bit lines $BL_1$~$BL_N$ are the data lines $DL_1$~$DL_X$, respectively. After one read cycle, the storage states of all memory cells in the selected row of the memory cell array 112 are acquired.

The reference current generator 120 provides a reference current $I_{REF}$ to the sensing circuit 130. The sensing circuit 130 judges the storage states of the selected memory cells according to the reference current $I_{REF}$. For example, each memory cell has two storage states. The first storage state is an on state. The second storage state is an off state. The memory cell in the on state generates a larger cell current $I_{CELL}$, which is also referred as an on current. The memory cell in the off state generates a smaller cell current (CELL, which is also referred as an off current.

As shown in FIG. 1, the sensing circuit 130 comprises X sense amplifiers 131~13x. The X sense amplifiers 131~13x are respectively connected with the corresponding data lines $DL_1$~$DL_X$. The X sense amplifiers 131~13x receive the reference current $I_{REF}$. According to the cell currents $I_{CELL}$ in the data lines $DL_1$~$DL_X$, the X sense amplifiers 131~13x generate the corresponding data signals $D_{O1}$~$D_{OX}$. The structures and the operating principles of the X sense amplifiers 131~13x are identical.

Take a single sense amplifier 131 for example. In a read cycle, a selected memory cell in the memory cell array 112 is connected with the data line $DL_1$ through the switching circuit 114. The sense amplifier 131 receives the reference current $I_{REF}$ and the cell current $I_{CELL}$. According to the magnitudes of the reference current $I_{REF}$ and the cell current $I_{CELL}$, the sense amplifier 131 generates the data signal $D_{O1}$ and determines the storage state of the selected memory cell. For example, if the cell current $I_{CELL}$ is higher than the reference current $I_{REF}$, the sense amplifier 131 generates the data signal $D_{O1}$ in a first logic level state to indicate that the selected memory cell is in the first storage state (i.e., the on state). Whereas, if the cell current $I_{CELL}$ is lower than the reference current $I_{REF}$, the sense amplifier 131 generates the data signal $D_{O1}$ in a second logic level state to indicate that the selected memory cell is in the second storage state (i.e., the off state).

Generally, the conventional non-volatile memory 100 receives a fixed supply voltage $V_S$. In case that the supply voltage $V_S$ changes, the change of the reference current $I_{REF}$ may result in misjudgment of the sensing circuit 130. For avoiding the misjudgment problem, the reference current generator 120 of the non-volatile memory 100 is usually equipped with a bandgap reference circuit. The reference current $I_{REF}$ generated by the bandgap reference circuit is nearly not varied with the supply voltage $V_S$. In case that the supply voltage $V_S$ changes, the bandgap reference circuit can still generate a stable reference current $I_{REF}$.

However, according to some specific specifications, the non-volatile memory 100 is allowed to receive a supply voltage $V_S$ in a wide range (e.g., 1.7V~5.75V) and work normally. That is, the user can determine a specific supply voltage $V_S$ between 1.7V~5.75V for the non-volatile memory 100, all of which will allow the non-volatile memory 100 to work normally. For example, in case that the user determines the supply voltage $V_S$ to be 1.7V in a first mode of the selected memory cell, the non-volatile memory 100 can work normally. Also, in case that the user determines the supply voltage $V_S$ to be 5.75V in a second mode of the selected memory cell, the non-volatile memory 100 can work normally.

However, when the supply voltage $V_S$ varies greatly, the cell current $I_{CELL}$ of the selected memory cell will change dramatically. Under this circumstance, the reference current $I_{REF}$ from the reference current generator 120 may result in misjudgment of the sensing circuit 130. In other words, the conventional reference current generator 120 with the bandgap reference circuit cannot be applied to the non-volatile memory 100 with the specific specifications.

SUMMARY OF THE INVENTION

An embodiment of the present invention provides a non-volatile memory. The non-volatile memory includes a memory module, a sensing circuit and a reference current generator. The memory module includes plural data lines. The sensing circuit is coupled to the plural data lines of the memory module. A first sense amplifier is coupled to a first data line of the plural data lines. The reference current generator receives a supply voltage. The reference current generator provides a reference current to the sensing circuit. The reference current generator includes a control voltage generation circuit, a first current path selecting circuit and a mirroring circuit. The control voltage generation circuit receives a control signal and generates a control voltage according to the control signal. The first current path selecting circuit receives a selection signal and the control voltage. The first current path selecting circuit generates the reference current according to the control voltage and the selection signal. A current input terminal of the mirroring circuit receives the reference current. A current mirroring terminal of the mirroring circuit is connected with the first sense amplifier. In a first read cycle, the first sense amplifier determines a storage state of a selected memory cell according to a cell current in the first data line and the reference current. If the control signal is set as a first value, the reference current is changed at a first slope in a range of the supply voltage. If the control signal is set as a second value, the reference current is changed at a second slope in the range of the supply voltage.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Generally, the process parameters and the process conditions of different foundries are not identical. Even if the memory cells with the same structure are produced, the characteristics of the memory cells are also different. Similarly, different batches of memory cells manufactured by the same foundry may have different characteristics. Consequently, when the memory cell array comprising memory cells is operated according to various supply voltages $V_S$, the cell currents generated by the memory cells have significant differences. The reasons will be described as follows by referring to the memory cell with NMOS transistors.

Figure 2A:
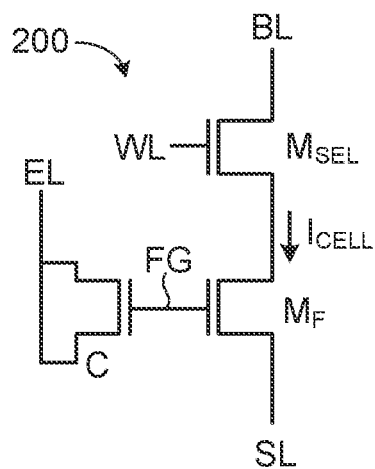
FIG. 2A is a schematic circuit diagram illustrating the equivalent circuit of a memory cell with N MOS transistors.
Figure 2B:
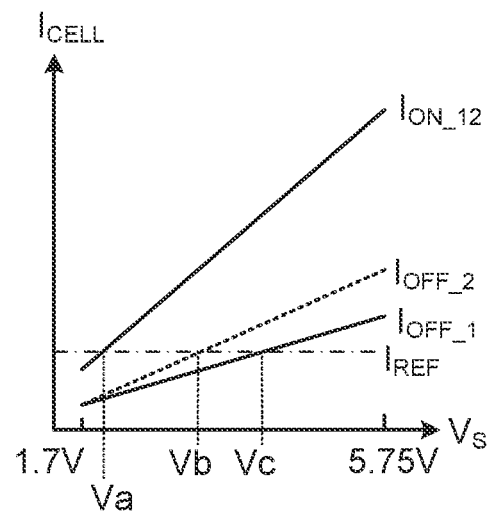
FIG. 2B is a plot illustrating the relationship between the supply voltage and the cell current about the memory cell of FIG. 2A in various storage states.

FIG. 2A is a schematic circuit diagram illustrating the equivalent circuit of a memory cell with NMOS transistors. FIG. 2B is a plot illustrating the relationship between the supply voltage and the cell current about the memory cell of FIG. 2A in various storage states. As shown in FIG. 2A, the memory cell 200 comprises a select transistor $M_{SEL}$, a floating gate transistor $M_F$ and a capacitor C. The memory cell 200 is a multi-time programmable memory cell, which is also referred as an MTP memory cell). In other words, the memory cell 200 may be subjected to a program action, an erase action or a read action.

The first drain/source terminal of the select transistor $M_{SEL}$ is connected with a bit line BL. The gate terminal of the select transistor $M_{SEL}$ is connected with a word line WL. The first drain/source terminal of the floating gate transistor $M_F$ is connected with the second drain/source terminal of the select transistor $M_{SEL}$. The second drain/source terminal of the floating gate transistor $M_F$ is connected with a source line SL. The first terminal of the capacitor C is connected with a floating gate FG of the floating gate transistor $M_F$. The second terminal of the capacitor C is connected with an erase line EL. For example, the capacitor C is composed of an NMOS transistor. The gate terminal of the NMOS transistor is the first terminal of the capacitor C. The first drain/source terminal and the second drain/source terminal of the NMOS transistor are connected with each other and served as the second terminal of the capacitor C.

For example, two memory cells with the same structure but different characteristics will be illustrated. Please refer to FIG. 2B. When the supply voltage $V_S$ rises from 1.7V to 5.75V, the on currents $I_{ON\_12}$ of the two memory cells in the first storage state (i.e., the on state) gradually increase. The rising slopes are similar. It can be regarded that the change amounts of the cell currents $I_{CELL}$ of the two memory cells in the on state are very close.

However, the rising slops of the cell currents $I_{CELL}$ generated by the two memory cells in the second storage state (i.e., the off state) are different when the supply voltage $V_S$ changes. In FIG. 2B, the solid line represents the change of the off current $I_{OFF\_1}$ of the first memory cell. When the supply voltage $V_S$ rises from 1.7V to 5.75V, the slope of the off current $I_{OFF\_1}$ is smaller. That is, the change amount of the cell current $I_{CELL}$ of the first memory cell is smaller. In FIG. 2B, the dashed line represents the change of the off current $I_{OFF\_2}$ of the second memory cell. When the supply voltage $V_S$ rises from 1.7V to 5.75V, the slope of the off current $I_{OFF\_2}$ is larger. That is, the change amount of the cell current $I_{CELL}$ of the second memory cell is larger. It is speculated that the above two memory cells may be manufactured in different foundries or manufactured in different batches.

Obviously, in case that the reference current $I_{REF}$ is not varied with the change of the supply voltage $V_S$, the sensing circuit may misjudge the storage state of the memory cell. As shown in FIG. 2B, the sensing circuit can correctly judge the storage state of the first memory cell when the supply voltage $V_S$ is in the range between Va (e.g., 2.0V) and Vc (e.g., 4.0V). The sensing circuit can correctly judge the storage state of the second memory cell when the supply voltage $V_S$ is in the range between Va (e.g., 2.0V) and Vb (e.g., 3.5V). However, if the supply voltage $V_S$ is lower than Va, the sensing circuit may erroneously judge that the two memory cells are in the off state regardless of the actual storage states of the memory cells. Similarly, if the supply voltage $V_S$ is higher than Vc, the sensing circuit may erroneously judge that the two memory cells are in the on state regardless of the actual storage states of the memory cells.

From the above illustration, it can be seen that different memory cells will have different variations of on/off current under different supply voltage $V_S$. For allowing the sensing circuit to correctly judge the storage state of the memory cell, the reference current generator needs to provide an appropriate reference current according to the characteristics of the memory cell. For example, the reference current generator may provide an appropriate reference current according to the characteristics of the on current $I_{ON}$ and the off current $I_{OFF}$ of the memory cell.

Figure 2C:
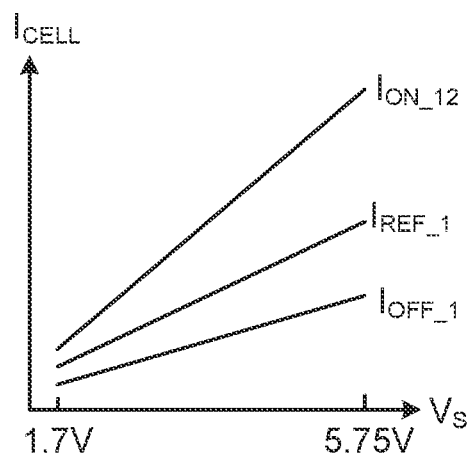
FIGS. 2C and 2D are plots illustrating the relationship between the supply voltage and the cell current about the memory cell, in which the reference current is determined according to the characteristics of the memory cell.
Figure 2D:
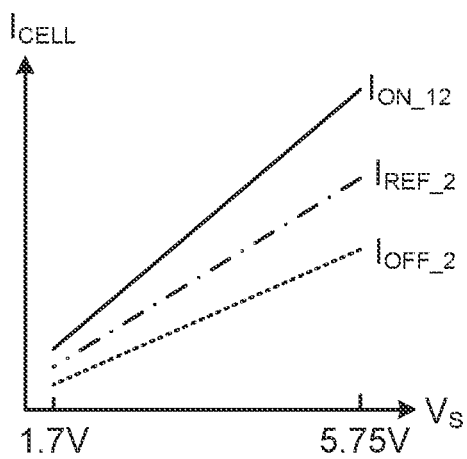

FIGS. 2C and 2D are plots illustrating the relationship between the supply voltage and the cell current about the memory cell, in which the reference current is determined according to the characteristics of the memory cell. In FIG. 2C, the cell current $I_{CELL}$ of the first memory cell in the on state is the on current $I_{ON\_12}$, and the cell current $I_{CELL}$ of the first memory cell in the off state is the off current $I_{OFF\_1}$. The reference current generator provides a first reference current $I_{REF\_1}$ to the sensing circuit. According to the first reference current $I_{REF\_1}$, the sense amplifier judges the storage state of the first memory cell. In FIG. 2D, the cell current $I_{CELL}$ of the second memory cell in the on state is the on current $I_{ON\_12}$, and the cell current $I_{CELL}$ of the second memory cell in the off state is the off current $I_{OFF\_2}$. The reference current generator provides a second reference current $I_{REF\_2}$ to the sensing circuit. According to the second reference current $I_{REF\_2}$, the sense amplifier judges the storage state of the second memory cell. As the supply voltage $V_S$ increases, the first reference current $I_{REF\_1}$ and the second reference current $I_{REF\_2}$ increase. In addition, the slope of the second reference current $I_{REF\_2}$ is larger than the slope of the first reference current $I_{REF\_1}$.

For allowing the sensing circuit of the non-volatile memory to correctly judge the storage state of the memory cell, the reference current generator of the present invention is specially designed, so that the reference current generator is capable of providing the reference currents with different slopes. In accordance with a feature of the present invention, the reference current generator provides a reference current with a specified slope to the sensing circuit according to the characteristics of the memory cell in the non-volatile memory.

Figure 1:
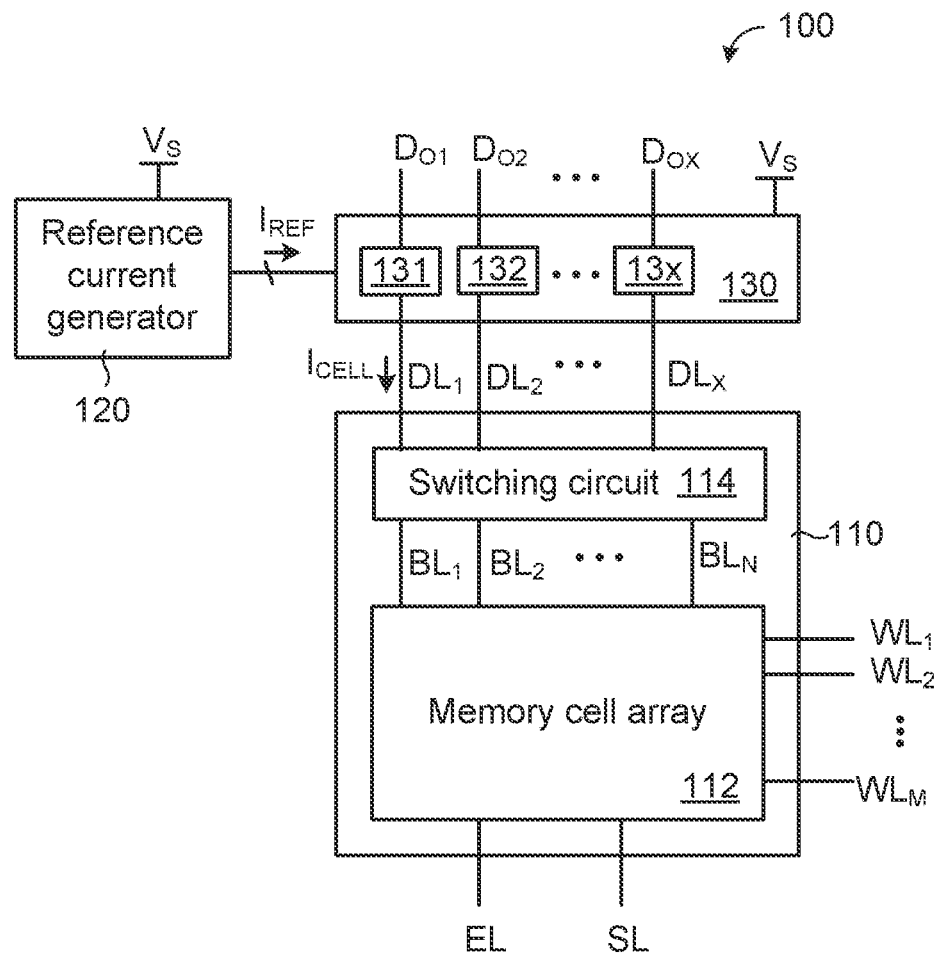
FIG. 1 (prior art) is a schematic circuit diagram illustrating a conventional non-volatile memory.
Figure 3:
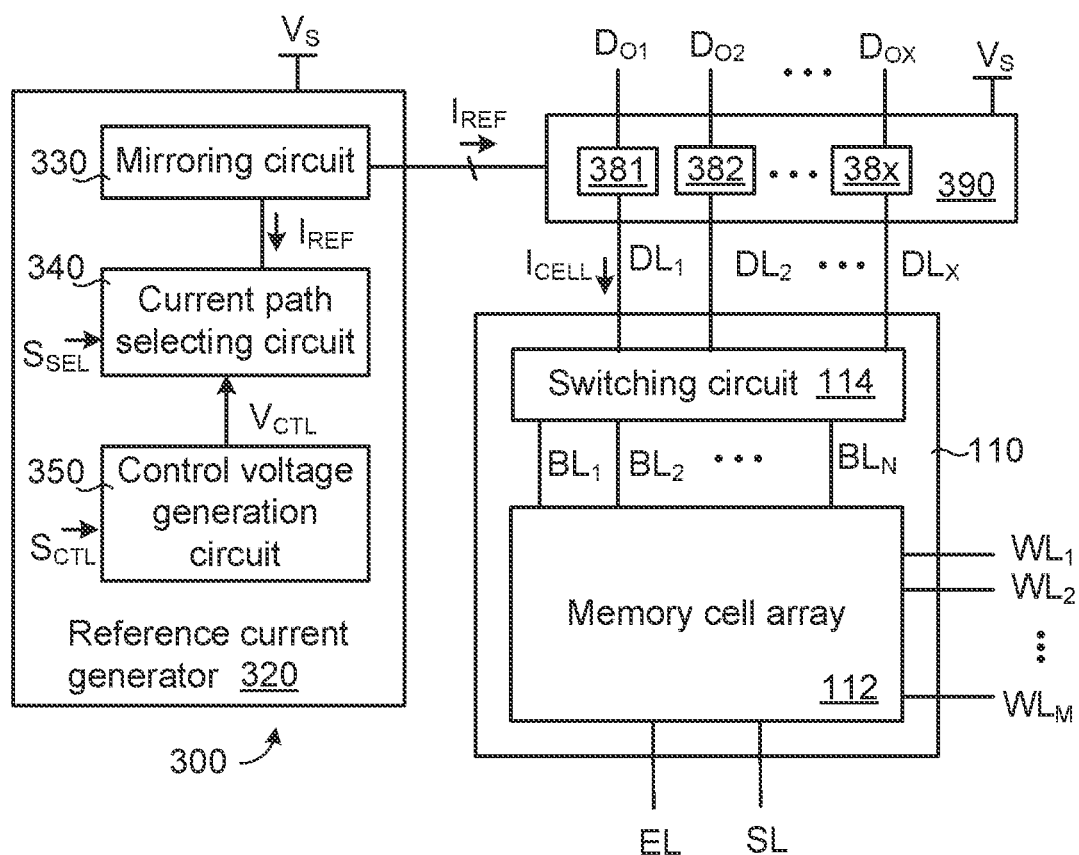
FIG. 3 is a schematic circuit diagram illustrating a non-volatile memory according to a first embodiment of the present invention.

FIG. 3 is a schematic circuit diagram illustrating a non-volatile memory according to a first embodiment of the present invention. As shown in FIG. 3, the non-volatile memory 300 comprises a memory module 110, a reference current generator 320 and a sensing circuit 390. The structures and the operating principles of the memory module 110 in this embodiment are identical to those of the memory module 110 shown in FIG. 1, and not redundantly described herein.

The sensing circuit 390 comprises X sense amplifiers 381~38x. The X sense amplifiers 381~38x are respectively connected with the corresponding data lines $DL_1$~$DL_X$. The X sense amplifiers 381~38x receive the reference current $I_{REF}$. According to the cell currents $I_{CELL}$ in the data lines $DL_1$~$DL_X$, the X sense amplifiers 381~38x generate the corresponding data signals $D_{O1}$~$D_{OX}$. The structures and the operating principles of the X sense amplifiers 381~38x are identical.

In this embodiment, the reference current generator 320 comprises a mirroring circuit 330, a current path selecting circuit 340 and a control voltage generation circuit 350.

The control voltage generation circuit 350 receives a control signal $S_{CTL}$ and generates a control voltage $V_{CTL}$. According to the control signal $S_{CTL}$, various change relationships between the supply voltage $V_S$ and the control voltage $V_{CTL}$ can be determined.

The current path selecting circuit 340 receives the control voltage $V_{CTL}$ and a selection signal $S_{SEL}$, and the current path selecting circuit 340 generates the reference current $I_{REF}$. Generally, the control voltage $V_{CTL}$ and the reference current $I_{REF}$ are in a positive correlation. That is, as the control voltage $V_{CTL}$ increases, the reference current $I_{REF}$ increases. Similarly, as the control voltage $V_{CTL}$ decreases, the reference current $I_{REF}$ decreases. In other words, the cooperation of the control voltage generation circuit 350 and the current path selecting circuit 340 can determine various slope variation relationships between the supply voltage $V_S$ and the reference current $I_{REF}$.

The mirroring circuit 330 receives the reference current $I_{REF}$. In addition, the reference current $I_{REF}$ is transmitted from the mirroring circuit 330 to the sense amplifiers 381~38x of the sensing circuit 390. According to the reference current $I_{REF}$, the sense amplifiers 381~38x judges the storage states of the corresponding selected memory cells.

Figure 4A:
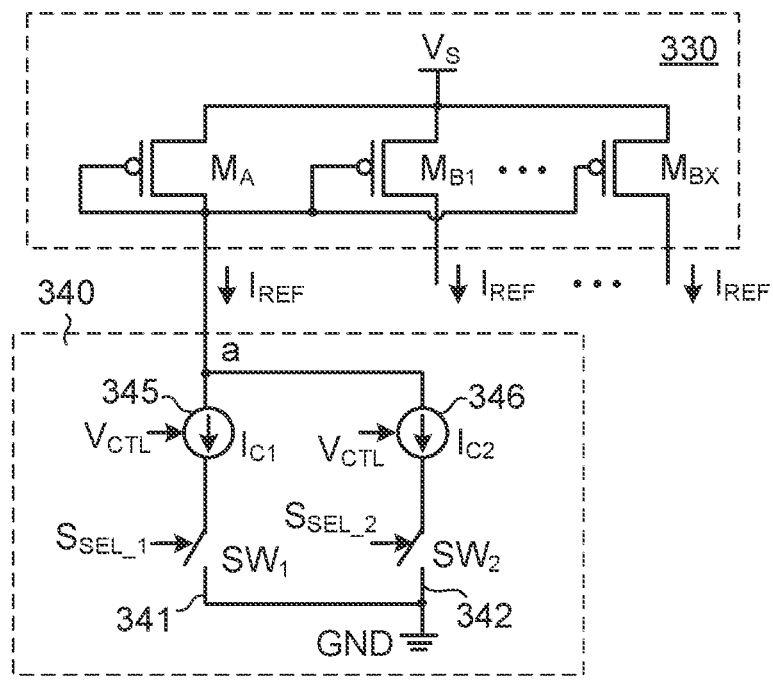
FIG. 4A is a schematic circuit diagram illustrating the mirroring circuit and the current path selecting circuit of the reference current generator in the non-volatile memory as shown in FIG. 3.

FIG. 4A is a schematic circuit diagram illustrating the mirroring circuit and the current path selecting circuit of the reference current generator in the non-volatile memory as shown in FIG. 3. As shown in FIG. 4A, the mirroring circuit 330 comprises a current input terminal and X current mirroring terminals. The current input terminal of the mirroring circuit 330 is connected with the current path selecting circuit 340 to receive the reference current $I_{REF}$. The X current mirroring terminals of the mirroring circuit 330 are respectively connected with the sense amplifiers 381~38x of the sensing circuit 390.

The mirroring circuit 330 comprises (X+1) transistors $M_A$ and $M_{B1}$~$M_{BX}$. The first drain/source terminal of the transistor $M_A$ receives the supply voltage $V_S$. The gate terminal of the transistor $M_A$ is connected with the second drain/source terminal of the transistor $M_A$. The second drain/source terminal of the transistor $M_A$ is the current input terminal of the mirroring circuit 330. The first drain/source terminal of the transistor $M_{B1}$ receives the supply voltage $V_S$. The gate terminal of the transistor $M_{B1}$ is connected with the gate terminal of the transistor $M_A$. The second drain/source terminal of the transistor $M_{B1}$ is the current mirroring terminal of the mirroring circuit 330. In addition, the second drain/source terminal of the transistor $M_{B1}$ is connected with the sense amplifier 381. Moreover, the transistors $M_{B1}$~$M_{BX}$ have the same connection relationship, and not redundantly described herein. The first drain/source terminal of the transistor $M_{BX}$ receives the supply voltage $V_S$. The gate terminal of the transistor $M_{BX}$ is connected with the gate terminal of the transistor $M_A$. The second drain/source terminal of the transistor $M_{BX}$ is the current mirroring terminal of the mirroring circuit 330. The second drain/source terminal of the transistor $M_{BX}$ is connected with the corresponding sense amplifier 38x.

In an embodiment, the sizes of the transistors $M_A$ and $M_{B1}$-$M_{BX}$ are identical. Consequently, when the current input terminal of the mirroring circuit 330 receives the reference current $I_{REF}$, the X current mirroring terminals of the mirroring circuit 330 can respectively output the reference currents $I_{REF}$ to the sense amplifiers 381~38x of the sensing circuit 390.

The current path selecting circuit 340 comprises two current paths 341 and 342. According to the control voltage $V_{CTL}$ the current paths 341 and 342 generate corresponding voltage-controlled currents $I_{C1}$ and $I_{C2}$, respectively. The selection signal $S_{SEL}$ is a two-bit signal. The two-bit signal contains two selection bits $S_{SEL\_1}$ and $S_{SEL\_2}$ corresponding to the current paths 341 and 342, respectively. In addition, at least one current path is activated according to the selection signal $S_{SEL}$. The total current of the activated current paths is the reference current $I_{REF}$.

In the current path selecting circuit 340, the current path 341 comprises a voltage-controlled current source 345 and a switch $SW_1$, and the current path 342 comprises a voltage-controlled current source 346 and a switch $SW_2$. The voltage-controlled current source 345 and the switch $SW_1$ of the current path 341 are serially connected between a node a and a ground terminal GND. According to the control voltage $V_{CTL}$, the voltage-controlled current source 345 generates the voltage-controlled current $I_{C1}$. The switch $SW_1$ is controlled according to the selection bit $S_{SEL\_1}$. The voltage-controlled current source 346 and the switch $SW_2$ of the current path 342 are serially connected between the node a and the ground terminal GND. According to the control voltage $V_{CTL}$, the voltage-controlled current source 346 generates the voltage-controlled current $I_{C2}$. The switch $SW_2$ is controlled according to the selection bit $S_{SEL\_2}$.

In an embodiment, the voltage-controlled current $I_{C1}$ generated by the current path 341 and the voltage-controlled current $I_{C2}$ generated by the current path 342 are in a fixed proportional relationship. For example, in case that the control voltage $V_{CTL}$ is 1.0V, the voltage-controlled current $I_{C1}$ and the voltage-controlled current $I_{C2}$ are 2.0 µA and 4.0 µA, respectively. Whereas, in case that the control voltage $V_{CTL}$ is 1.2V, the voltage-controlled current $I_{C1}$ and the voltage-controlled current $I_{C2}$ are 2.4 µA and 4.8 µA, respectively. It is noted that the ratio between the voltage-controlled current $I_{C1}$ and the voltage-controlled current $I_{C2}$ is not restricted.

Moreover, according to the selection signal $S_{SEL}$, at least one of the two switches $SW_1$ and $SW_2$ is controlled to be in a close state. For example, if the selection bit $S_{SEL\_1}$ is in the logic level state "1", the switch $SW_1$ is in the close state, and the current path 341 is activated. Whereas, if the selection bit $S_{SEL\_1}$ is in the logic level state "0", the switch $SW_1$ is in the open state, and the current path 341 is inactivated. In other words, the switches $SW_1$ and $SW_2$ are controlled to be in the close state or the open state according to the binary value of the selection signal $S_{SEL}$.

For example, if the two selection bits $<S_{SEL\_1}, S_{SEL\_2}>$ of the selection signal $S_{SEL}$ are $<1, 1>$, the current path 341 and the current path 342 are activated. Consequently, the reference current $I_{REF}$ is equal to $I_{C1}+I_{C2}$. Moreover, if the two selection bits $<S_{SEL\_1}, S_{SEL\_2}>$ of the selection signal $S_{SEL}$ are $<0, 1>$, the current path 341 is inactivated, but the current path 342 is activated. Consequently, the reference current $I_{REF}$ is equal to $I_{C2}$.

In FIG. 4A, the current path selecting circuit 340 comprises the two current paths 341 and 342. As long as the number of the current paths in the current path selecting circuit 340 is larger than or equal to 1, the number of the current paths in the current path selecting circuit 340 is not restricted. For example, in another embodiment, the current path selecting circuit 340 comprises three current paths, and the selection signal $S_{SEL}$ is a three-bit signal.

Figure 4B:
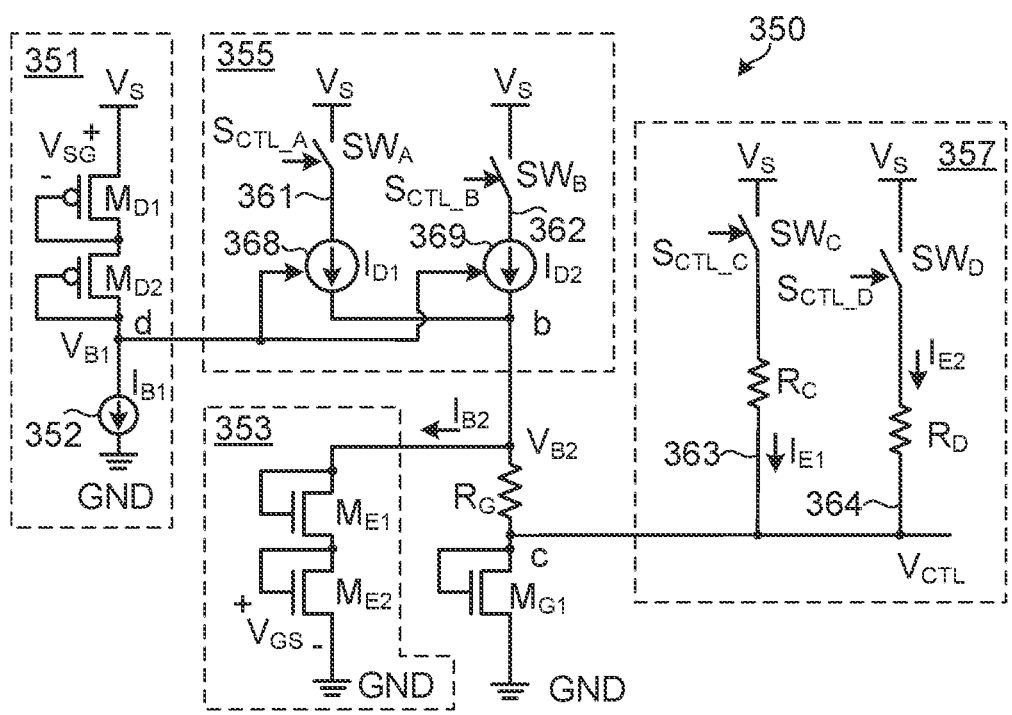
FIG. 4B is a schematic circuit diagram illustrating a control voltage generation circuit of the reference current generator in the non-volatile memory as shown in FIG. 3.

FIG. 4B is a schematic circuit diagram illustrating a control voltage generation circuit of the reference current generator in the non-volatile memory as shown in FIG. 3. As shown in FIG. 4B, the control voltage generation circuit 350 comprises a transistor $M_{G1}$, a resistor $R_G$, two bias circuits 351, 353 and two current path selecting circuits 355, 357.

The first terminal of the resistor $R_G$ is connected with a node b. The second terminal of the resistor $R_G$ is connected with a node c. The first drain/source terminal of the transistor $M_{G1}$ is connected with the node c. The gate terminal of the transistor $M_{G1}$ is connected with the node c. The second drain/source terminal of the transistor $M_{G1}$ is connected with the ground terminal GND. Moreover, the voltage at the node c is served as the control voltage $V_{CTL}$.

The bias circuit 351 comprises two diode-connected transistors $M_{D1}$ and $M_{D2}$ and a current source 352. The diode-connected transistors $M_{D1}$ and $M_{D2}$ are serially connected between the supply voltage $V_S$ and a node d. That is, the first drain/source terminal of the transistor $M_{D1}$ receives the supply voltage $V_S$, the gate terminal of the transistor $M_{D1}$ is connected with the second drain/source terminal of the transistor $M_{D1}$, the first drain/source terminal of the transistor $M_{D2}$ is connected with the second drain/source terminal of the transistor $M_{D1}$, the gate terminal of the transistor $M_{D2}$ is connected with the node d, and the second drain/source terminal of the transistor $M_{D2}$ is connected with the node d. Moreover, the first terminal of the current source 352 is connected with the node d, and the second terminal of the current source 352 is connected with the ground terminal GND.

In an embodiment, the sizes of the transistors $M_{D1}$ and $M_{D2}$ are identical, and the current source 352 provides a bias current Is1. Consequently, the bias voltage $V_{B1}$ at the node d is approximately equal to $V_S - 2V_{SG}$, wherein $V_{SG} = (\sqrt{I_{B1}/K_p} - V_{THP})$, $V_{SG}$ is the voltage difference between the source terminal and the gate terminal of the transistor $M_{D1}$, $K_p$ is a device parameter of the transistor $M_{D1}$, and $V_{THP}$ is the threshold voltage of the transistor $M_{D1}$, and assume that the transistors $M_{D1}$ and $M_{D2}$ have the same threshold voltage $V_{THP}$ in ideal. In addition, the threshold voltage $V_{THP}$ is negative.

The bias voltage 353 comprises two diode-connected transistors $M_{E1}$ and $M_{E2}$. The diode-connected transistors $M_{E1}$ and $M_{E2}$ are serially connected between the node b and the ground terminal GND. That is, the first drain/source terminal of the transistor $M_{E1}$ is connected with the node b, the gate terminal of the transistor $M_{E1}$ is connected with the node b, the first drain/source terminal of the transistor $M_{E2}$ is connected with the second drain/source terminal of the transistor $M_{E1}$, the gate terminal of the transistor $M_{E2}$ is connected with the first drain/source of the transistor $M_{E2}$, and the second drain/source terminal of the transistor $M_{E2}$ is connected with the ground terminal GND. Moreover, the bias voltage $V_{B2}$ at the node b is determined according to the bias current $I_{B2}$.

For example, the sizes of the transistor $M_{E1}$ and the transistor $M_{E2}$ are identical. Consequently, the bias voltage $V_{B2}$ at the node b is approximately equal to $2V_{GS}$, wherein $V_{GS} = (\sqrt{I_{B2}/K_n} + V_{THN})$, $V_{SG}$ is the voltage difference between the gate terminal and the drain terminal of the transistor $M_{E2}$, $K_n$ is a device parameter of the transistor $M_{E2}$, and $V_{THN}$ is the threshold voltage of the transistor $M_{E2}$, and assume that the transistors MEI and $M_{E2}$ have the same threshold voltage $V_{THN}$ in ideal. In addition, the threshold voltage $V_{THN}$ is positive.

The current path selecting circuit 355 comprises two current paths 361 and 362. According to the bias voltage $V_{B1}$, the current paths 361 and 362 generate the corresponding voltage-controlled currents $I_{D1}$ and $I_{D2}$ respectively. In addition, the control signal $S_{CTL}$ is a four-bit signal. The four-bit signal contains four control bits $S_{CTL\_A}$, $S_{CTL\_B}$, $S_{CTL\_C}$ and $S_{CTL\_D}$. The current path 361 is controlled according to the control bit $S_{CTL\_A}$. The current path 362 is controlled according to the control bit $S_{CTL\_B}$. In addition, at least one current path of the current path selecting circuit 355 is activated according to the control signal $S_{CTL}$.

In the current path selecting circuit 355, the current path 361 comprises a voltage-controlled current source 368 and a switch $SW_A$, and the current path 362 comprises a voltage-controlled current source 369 and a switch $SW_B$. The voltage-controlled current source 368 and the switch SW A of the current path 361 are serially connected between the supply voltage $V_S$ and the node b. According to the bias voltage $V_{B1}$, the voltage-controlled current source 368 generates the voltage-controlled current $I_{D1}$. The switch $SW_A$ is controlled according to the control bit $S_{CTL\_A}$. The voltage-controlled current source 369 and the switch $SW_B$ of the current path 362 are serially connected between the supply voltage $V_S$ and the node b. According to the bias voltage $V_{B1}$, the voltage-controlled current source 369 generates the voltage-controlled current $I_{D2}$. The switch $SW_B$ is controlled according to the control bit $S_{CTL\_B}$.

In an embodiment, the magnitudes of the voltage-controlled currents $I_{D1}$ and $I_{D2}$ generated by the voltage-controlled current sources 368, 369 are different. For example, the magnitude of the voltage-controlled current $I_{D1}$ is higher than the magnitude of the voltage-controlled current $I_{D2}$. Moreover, according to the control signal $S_{CTL}$, at least one of the two switches SW A and SW B is controlled to be in a close state. For example, if the control bit $S_{CTL\_A}$ is in the logic level state "0", the switch $SW_A$ is in the close state, and the current path 361 is activated. Whereas, if the control bit $S_{CTL\_A}$ is in the logic level state "1", the switch SW A is in the open state, and the current path 361 is inactivated. For example, if the two control bits <$S_{CTL\_A}$, $S_{CTL\_B}$> of the control signal $S_{CTL}$ is <1, 0>, the current path 362 is activated, but the current path 361 is inactivated.

The current path selecting circuit 357 comprises two current paths 363 and 364. The current paths 363 and 364 generate the corresponding currents $I_{E1}$ and $I_{E2}$ respectively. The current path 363 is controlled according to the control bit $S_{CTL\_C}$ of the control signal $S_{CTL}$. The current path 364 is controlled according to the control bit $S_{CTL\_D}$ of the control signal $S_{CTL}$.

In the current path selecting circuit 357, the current path 363 comprises a resistor $R_C$ and a switch $SW_C$, and the current path 364 comprises a resistor R D and a switch $SW_D$. The resistor $R_C$ and the switch $SW_C$ of the current path 363 are serially connected between the supply voltage $V_S$ and the node c. The switch $SW_C$ is controlled according to the control bit $S_{CTL\_C}$ of the control signal $S_{CTL}$. The resistor RD and the switch SW D of the current path 364 are serially connected between the supply voltage $V_S$ and the node c. The switch $SW_D$ is controlled according to the control bit $S_{CTL\_D}$ of the control signal $S_{CTL}$.

In an embodiment, the resistance of the resistor $R_C$ of the current path 363 and the resistance of the resistor R D of the current path 364 are different. Consequently, the magnitudes of the currents $I_{E1}$ and $I_{E2}$ are different. For example, the magnitude of the resistance of the resistor RD is lower than the magnitude of the resistance of the resistor RD. That is, the current $I_{E1}$ is lower than the current $I_{E2}$. Moreover, if the control bit $S_{CTL}$ c is in the logic level state "0", the switch $SW_C$ is in the close state, and the current path 363 is activated. Whereas, if the control bit $S_{CTL\_C}$ is in the logic level state "1", the switch $SW_C$ is in the open state, and the current path 363 is inactivated. For example, if the two control bits <$S_{CTL\_C}$, $S_{CTL\_D}$> of the control signal $S_{CTL}$ is <1, 0>, the current path 364 is activated, and the current path 363 is inactivated. In other words, the switches $SW_A \sim SW_D$ of the current path selecting circuits 355 and 357 are controlled to be in the close state or the open state according to the binary value of the control signal $S_{CTL}$.

In FIG. 4B, each of the two current path selecting circuits 355 and 357 comprise the two current paths. In practice, the number of the current paths in each of the current path selecting circuits 355 and 357 is not restricted. The total number of the current paths in the current path selecting circuits 355 and 357 is equal to the number of the control bits in the control signal $S_{CTL}$.

When the output current from the current path selecting circuit 355 flows to the node b, a portion of the output current is served as the bias current $I_{B2}$ flowing to the bias circuit 353, and another portion of the output current flows to the ground terminal GND through the resistor $R_G$ and the transistor $M_{G1}$. In addition, the output current from the current path selecting circuit 357 flows to the node c and then flows to the ground terminal GND through the transistor $M_{G1}$.

The bias circuit 353 generates the bias voltage $V_{B2}$ according to the bias current $I_{B2}$. The bias voltage $V_{B2}$ is in proportion to the voltage difference $V_{GS}$ of the transistor $M_{E2}$, and the voltage difference $V_{GS}$ is in proportion to the square root of the bias current $I_{B2}$. When different supply voltage $V_S$ are provided to the non-volatile memory 300, the bias current $I_{B2}$ will change. Furthermore, the change of the bias current $I_{B2}$ will cause slight change of the bias voltage $V_{B2}$ generated by the bias circuit 353. That is, when different supply voltage $V_S$ are provided to the non-volatile memory 300, the change of the output current from the current path selecting circuit 355 may result in a tiny change of the control voltage $V_{CTL}$. In addition, the output current from the current path selecting circuit 357 flows to the node c. When different supply voltage $V_S$ are provided to the non-volatile memory 300, the change of the output current from the current path selecting circuit 357 will directly result in a large change of the control voltage $V_{CTL}$.

In this embodiment, the control signal $S_{CTL}$ is utilized to determine the current flowing to the node b and the current flowing to the node c, which result in different amplitude changes of the control voltage $V_{CTL}$. Therefore, after the control voltage $V_{CTL}$ is inputted into the current path selecting circuit 340, the reference current $I_{REF}$ with different slopes will be generated.

Figure 5A:
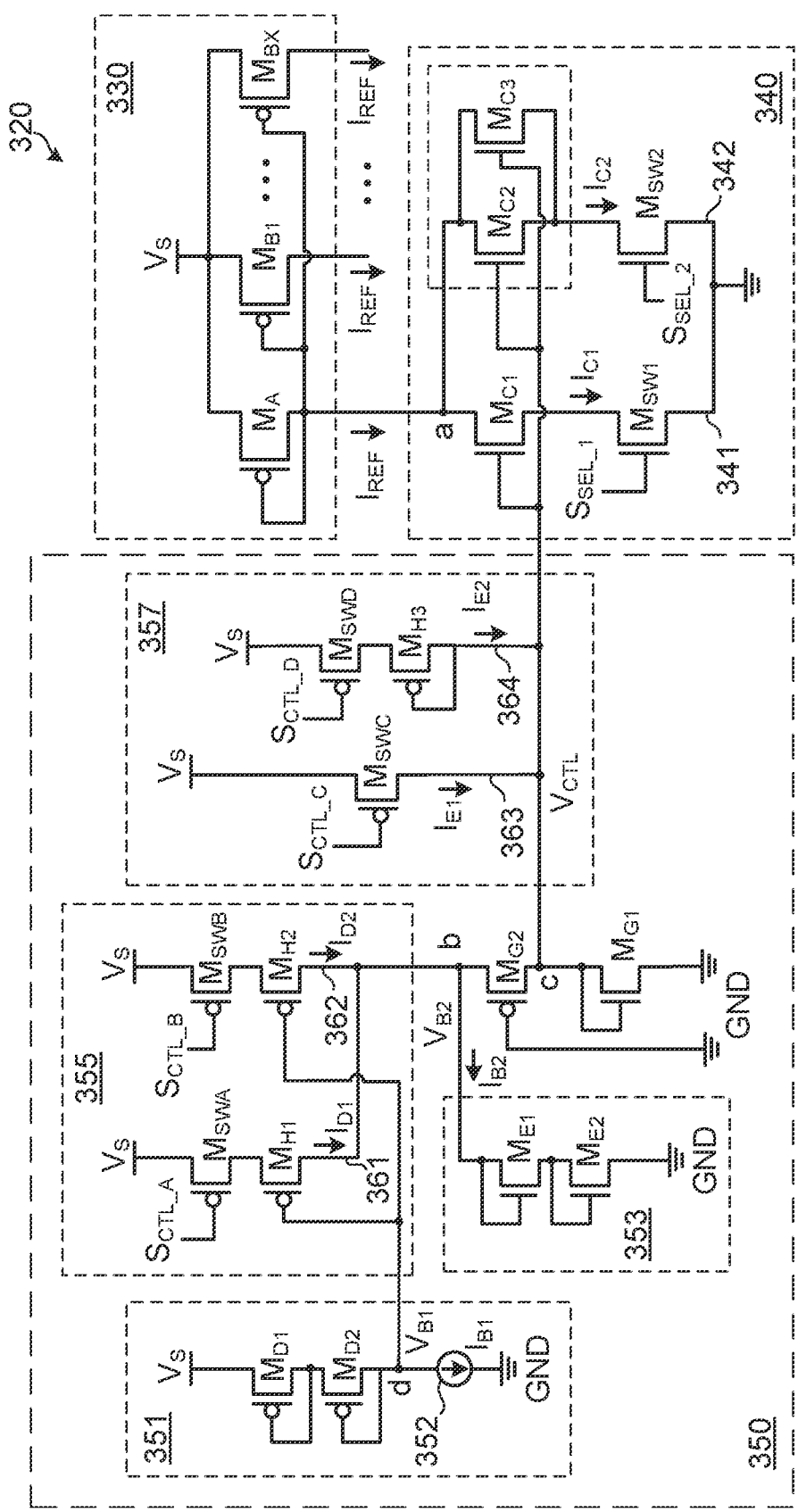
FIG. 5A is a schematic circuit diagram illustrating the detailed circuitry structure of the reference current generator in the non-volatile memory according to the first embodiment of the present invention.

FIG. 5A is a schematic circuit diagram illustrating the detailed circuitry structure of the reference current generator in the non-volatile memory according to the first embodiment of the present invention. The reference current generator 320 comprises the mirroring circuit 330, the current path selecting circuit 340 and the control voltage generation circuit 350. The circuitry structure of the mirroring circuit 330 is similar to that shown in FIG. 4A, and not redundantly described herein.

In the current path selecting circuit 340, the transistors $M_{SW1}$ and $M_{SW2}$ are served as the switches, and transistors $M_{C1} \sim M_{C3}$ are served as the voltage-controlled current sources. In addition, the selection signal $S_{SEL}$ comprises two selection bits $S_{SEL\_1}$ and $S_{SEL\_2}$.

The current path 341 of the current path selecting circuit 340 comprises two transistors $M_{C1}$ and $M_{SW1}$. The first drain/source terminal of the transistor $M_{C1}$ is connected with the node a. The gate terminal of the transistor $M_{C1}$ receives the control signal $V_{CTL}$. The first drain/source terminal of the transistor $M_{SW1}$ is connected with the second drain/source terminal of the transistor $M_{C1}$. The gate terminal of the transistor $M_{SW1}$ receives the selection bit $S_{SEL\_1}$. The second drain/source of the transistor $M_{SW1}$ is connected with the ground terminal GND.

The current path 342 of the current path selecting circuit 340 comprises two transistors $M_{C2}$ and $M_{C3}$ and a transistor $M_{SW2}$. The first drain/source terminal of the transistor $M_{C2}$ is connected with the node a. The gate terminal of the transistor $M_{C2}$ receives the control signal $V_{CTL}$. The first drain/source terminal of the transistor $M_{C3}$ is connected with the node a. The gate terminal of the transistor $M_{C3}$ receives the control signal $V_{CTL}$. The first drain/source terminal of the transistor $M_{SW2}$ is connected with the second drain/source terminal of the transistor Mu and the second drain/source terminal of the transistor $M_{C3}$. The gate terminal of the transistor $M_{SW2}$ receives the selection bit $S_{SEL\_2}$. The second drain/source terminal of the transistor $M_{SW2}$ is connected with the ground terminal GND.

In an embodiment, the size of each of the transistors $M_{C1}$, Mcg and $M_{C3}$ is equal to the size of the floating gate transistor of the memory cell. Consequently, the voltage-controlled current $I_{C1}$ in the current path 341 and the voltage-controlled current $I_{C2}$ in the current path 342 are in a specified proportional relationship, e.g., 1:2. In some other embodiments, the voltage-controlled current source in the current path 342 comprises a single transistor $M_{C2}$. In this case, the sizes of the transistors $M_{C1}$ and $M_{C2}$ are specially designed such that the voltage-controlled current $I_{C1}$ in the current path 341 and the voltage-controlled current $I_{C2}$ in the current path 342 are in a specified proportional relationship. For example, the size of the transistor $M_{C2}$ is x times the size of the transistor $M_{C1}$. Consequently, the voltage-controlled currents $I_{C1}$ and $I_{C2}$ are in the 1:x relationship, and x can be any positive value.

The control voltage generation circuit 350 comprises a transistor $M_{G1}$, a transistor $M_{G2}$, the two bias circuits 351 and 353 and the two current path selecting circuits 355 and 357. The connection relationships of the transistor $M_{G1}$, the bias circuit 351 and the bias circuit 353 are identical to those of FIG. 4B, and not redundantly described herein. Moreover, the control signal $S_{CTL}$ contains the control bits $S_{CTL\_A}$, $S_{CTL\_B}$, $S_{CTL\_C}$ and $S_{CTL\_D}$.

The first drain/source terminal of the transistor $M_{G2}$ is connected with the node b. The gate terminal of the transistor $M_{G2}$ is connected with the ground terminal GND. The second drain/source terminal of the transistor $M_{G2}$ is connected with the node c. The transistor $M_{G2}$ may be equivalently regarded as a resistor.

In the current path selecting circuit 355, the transistors $M_{SWA}$ and $M_{SWB}$ are served as the switches, and the transistors $M_{H1}$ and $M_{H2}$ are served as the voltage-controlled current sources. The current path 361 comprises the transistor $M_{H1}$ and the transistor $M_{SWA}$. The first drain/source terminal of the transistor $M_{SWA}$ receives the supply voltage $V_S$. The gate terminal of the transistor $M_{SWA}$ receives the control bit $S_{CTL\_A}$. The first drain/source terminal of the transistor $M_{H1}$ is connected with the second drain/source terminal of the transistor $M_{SWA}$. The gate terminal of the transistor $M_{H1}$ receives the bias voltage $V_{B1}$. The second drain/source terminal of the transistor $M_{H1}$ is connected with the node b.

The current path 362 of the current path selecting circuit 355 comprises a transistor $M_{H2}$ and a transistor $M_{SWB}$. The first drain/source terminal of the transistor $M_{SWB}$ receives the supply voltage $V_S$. The gate terminal of the transistor $M_{SWB}$ receives the control bit $S_{CTL\_B}$. The first drain/source terminal of the transistor $M_{H2}$ is connected with the second drain/source terminal of the transistor $M_{SWB}$. The gate terminal of the transistor $M_{H2}$ receives the bias voltage $V_{B1}$. The second drain/source terminal of the transistor $M_{H2}$ is connected with the node b.

In an embodiment, the size of the transistors $M_{H1}$ and $M_{H2}$ are different. Consequently, the voltage-controlled current $I_{D1}$ in the current path 361 and the voltage-controlled current $I_{D2}$ in the current path 362 are in a specified proportional relationship. For example, the size of the transistor $M_{H1}$ is larger than the size of the transistor $M_{H2}$. Consequently, the voltage-controlled current $I_{D1}$ is higher than the voltage-controlled current $I_{D2}$.

In the current path selecting circuit 357, the transistors $M_{SWC}$ and $M_{SWD}$ are served as the switches, and the transistors $M_{SWC}$ and $M_{SWD}$ and the transistor $M_{H3}$ are served as the resistors. The current path 363 comprises the transistor $M_{SWC}$. The first drain/source terminal of the transistor $M_{SWC}$ receives the supply voltage $V_S$. The gate terminal of the transistor $M_{SWC}$ receives the control bit $S_{CTL\_C}$. The second drain/source terminal of the transistor $M_{SWC}$ is connected with the node c. When the transistor $M_{SWC}$ is turned on, the current path 363 is activated. Meanwhile, the internal resistance of the transistor $M_{SWC}$ may be regarded as the resistor.

The current path 364 of the current path selecting circuit 357 comprises a transistor $M_{H3}$ and a transistor $M_{SWD}$. The drain/source terminal of the transistor $M_{SWD}$ receives the supply voltage $V_S$. The gate terminal of the transistor $M_{SWD}$ receives the control bit $S_{CTL\_D}$. The first drain/source terminal of the transistor $M_{H3}$ is connected with the second drain/source terminal of the transistor $M_{SWD}$. The gate terminal of the transistor $M_{H3}$ is connected with the node c. The second drain/source terminal of the transistor $M_{H3}$ is connected with the node c. It is designed that the current $I_{E2}$ is higher than the current $I_{E1}$. In accordance with a circuitry design, $I_{D1}>I_{D2}$, $I_{E2}>I_{E1}$, and $(I_{D1}+I_{E1})$ is approximately equal to $(I_{D2}+I_{E2})$.

As mentioned above, when the supply voltage $V_S$ rises, the output current from the current path selecting circuit 355 may result in a tiny change of the control voltage $V_{CTL}$. In addition, the output current from the current path selecting circuit 357 may directly influence the control voltage $V_{CTL}$. The current flowing to the node b and the current flowing to the node c are selected according to the control signal $S_{CTL}$. That is, when different supply voltage $V_S$ are provided to the non-volatile memory 300, the extent of the change of the control voltage $V_{CTL}$ may be different. In addition, the reference current $I_{REF}$ with different slopes will be generated according to the control signal $S_{CTL}$.

Figure 5B:
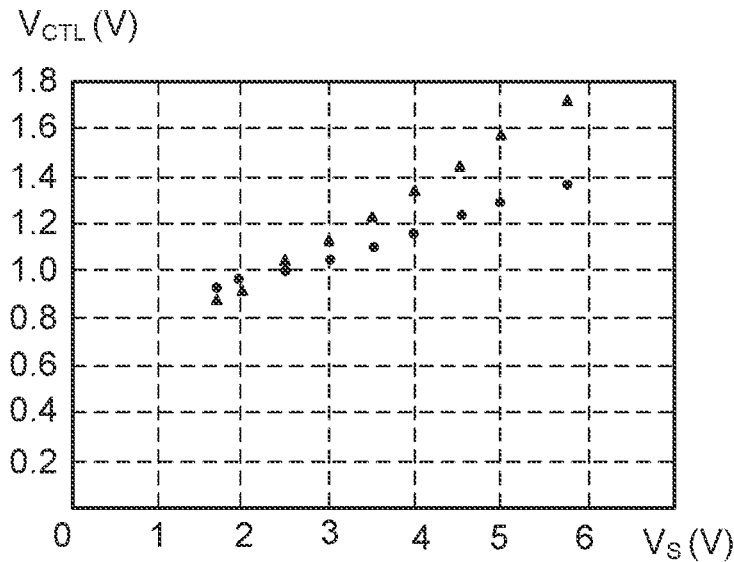
FIG. 5B is a plot illustrating the relationship between the control voltage and the supply voltage of the reference current generator in the non-volatile memory according to the first embodiment of the present invention.

FIG. 5B is a plot illustrating the relationship between the control voltage and the supply voltage of the reference current generator in the non-volatile memory according to the first embodiment of the present invention.

If the control bits of the control signal $S_{SEL}$ <$S_{CTL\_A}$, $S_{CTL\_B}$, $S_{CTL\_C}$, $S_{CTL\_D}$> are <0, 1, 0, 1>, the current path 361 of the current path selecting circuit 355 is activated, and the current path 363 of the current path selecting circuit 357 is activated. As shown in FIG. 5B, the relationships between the control voltage $V_{CTL}$ and the supply voltage $V_S$ are indicated as circular symbols. For example, if the supply voltage $V_S$ is 1.7V, the control voltage $V_{CTL}$ is approximatively 0.972V. If the supply voltage $V_S$ is 5.75V, the control voltage $V_{CTL}$ is approximatively 1.359V.

Whereas, if the control bits of the control signal $S_{SEL}$ <$S_{CTL\_A}$, $S_{CTL\_B}$, $S_{CTL\_C}$, $S_{CTL\_D}$> is <1, 0, 1, 0>, the current path 362 of the current path selecting circuit 355 is activated, and the current path 364 of the current path selecting circuit 357 is activated. As shown in FIG. 5B, the relationships between the control voltage $V_{CTL}$ and the supply voltage $V_S$ are indicated as triangular symbols. For example, if the supply voltage $V_S$ is 1.7V, the control voltage $V_{CTL}$ is approximatively 0.878V. If the supply voltage $V_S$ is 5.75V, the control voltage $V_{CTL}$ is approximatively 1.765V.

As mentioned above in FIG. 5B, when different current paths in the control voltage generation circuit 350 are activated according to the control signal $S_{CTL}$, the control voltage $V_{CTL}$ has different slopes with respect to the supply voltage $V_S$. In other words, when different supply voltage $V_S$ are provided to the non-volatile memory 300, the change slope of the control voltage $V_{CTL}$ can be determined according to the control signal $S_{CTL}$.

Figure 5C:
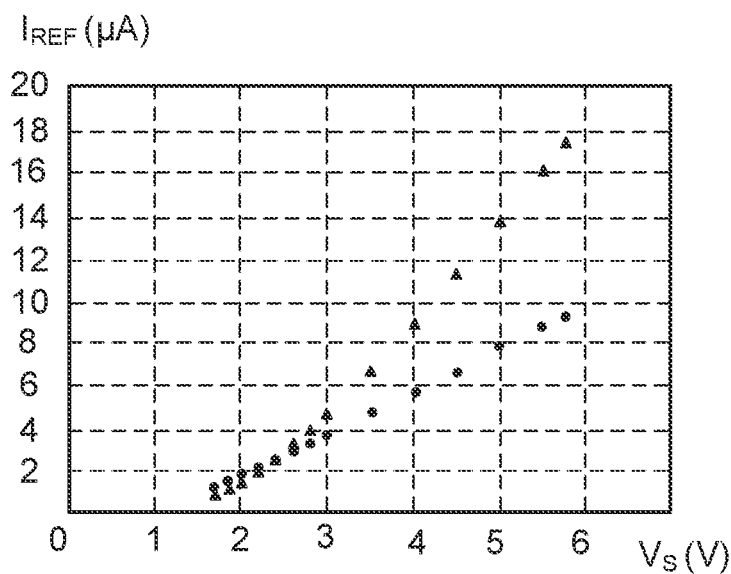
FIG. 5C is a plot illustrating the relationship between the reference current and the supply voltage of the reference current generator in the non-volatile memory according to the first embodiment of the present invention.

FIG. 5C is a plot illustrating the relationship between the reference current and the supply voltage of the reference current generator in the non-volatile memory according to the first embodiment of the present invention. The cooperation of the control voltage generation circuit and the current path selecting circuit result in the generation of the reference current. In this embodiment, the selection bits <$S_{SEL\_1}$, $S_{SEL\_2}$> of the selection signal $S_{SEL}$ are <1, 0>. That is, the current path 341 of the current path selecting circuit 340 is activated.

If the control bits of the control signal $S_{SEL}$ <$S_{CTL\_A}$, $S_{CTL\_B}$, $S_{CTL\_C}$, $S_{CTL\_D}$> are <0, 1, 0, 1>, the current path 361 of the current path selecting circuit 355 is activated, and the current path 363 of the current path selecting circuit 357 is activated. As shown in FIG. 5C, the relationships between the reference current $I_{REF}$ and the supply voltage $V_S$ are indicated as circular symbols. For example, if the supply voltage $V_S$ is 1.7V, the reference current $I_{REF}$ is approximatively 1.31 µA. If the supply voltage $V_S$ is 5.75V, the reference current $I_{REF}$ is approximatively 9.329 µA.

Whereas, if the control bits of the control signal $S_{SEL}$<$S_{CTL\_A}$, $S_{CTL\_B}$, $S_{CTL\_C}$, $S_{CTL\_D}$> is <1, 0, 1, 0>, the current path 362 of the current path selecting circuit 355 is activated, and the current path 364 of the current path selecting circuit 357 is activated. As shown in FIG. 5C, the relationships between the reference current $I_{REF}$ and the supply voltage $V_S$ are indicated as triangular symbols. For example, if the supply voltage $V_S$ is 1.7V, the reference current $I_{REF}$ is approximatively 0.879 µA. If the supply voltage $V_S$ is 5.75V, the reference current $I_{REF}$ is approximatively 17.42 µA.

As mentioned above in FIG. 5C, when different current paths in the control voltage generation circuit 350 are activated according to the control signal $S_{CTL}$, the reference current $I_{REF}$ has different slopes with respect to the supply voltage $V_S$. In other words, when different supply voltage $V_S$ are provided to the non-volatile memory 300, the change slope of the reference current $I_{REF}$ can be determined according to the control signal $S_{CTL}$.

Moreover, if the two selection bits <$S_{SEL\_1}$, $S_{SEL\_2}$> of the selection signal S SEL are <0, 1>, the current path 342 of the current path selecting circuit 340 is activated. Consequently, the reference current $I_{REF}$ outputted from the current path selecting circuit is further doubled.

For example, in FIG. 5C, the circular symbols represent that the selection bits <$S_{SEL\_1}$, $S_{SEL\_2}$> of the selection signal $S_{SEL}$ are <1, 0>. If the supply voltage $V_S$ is 1.7V, the reference current $I_{REF}$ is approximatively 1.31 µA. If the supply voltage $V_S$ is 5.75V, the reference current $I_{REF}$ is approximatively 9.329 µA. Whereas, if the two selection bits <$S_{SEL\_1}$, $S_{SEL\_2}$> of the selection signal $S_{SEL}$ are <0, 1> and the supply voltage $V_S$ is 1.7V, the reference current $I_{REF}$ is approximatively 2.62 µA. If the supply voltage $V_S$ is 5.75V, the reference current $I_{REF}$ is approximatively 18.658 µA.

As mentioned above, when the supply voltage $V_S$ rises, the output current from the current path selecting circuit 355 may result in a tiny change of the control voltage $V_{CTL}$. In addition, the output current from the current path selecting circuit 357 may directly influence the control voltage $V_{CTL}$. The current flowing to the node b and the current flowing to the node c are selected according to the control signal $S_{CTL}$. That is, when different supply voltage $V_S$ are provided to the non-volatile memory 300, the extent of the change of the control voltage $V_{CTL}$ may be different. In addition, the reference current $I_{REF}$ with different slopes will be generated according to the control signal $S_{CTL}$.

In the above embodiments, the control voltage generation circuit 350 comprises the two current path selecting circuits 355 and 357. It is noted that numerous modifications and alterations may be made while retaining the teachings of the invention. For example, in another embodiment, the control voltage generation circuit 350 is equipped with the current path selecting circuit 355 but not equipped with the current path selecting circuit 357. In addition, the current path selecting circuit 355 of the control voltage generation circuit 350 is activated according to the control signal $S_{CTL}$. Consequently, when different supply voltage $V_S$ are provided to the non-volatile memory 300, the change slope of the control voltage $V_{CTL}$ is lower and the change slope of the reference current $I_{REF}$ is lower.

Figure 6A:
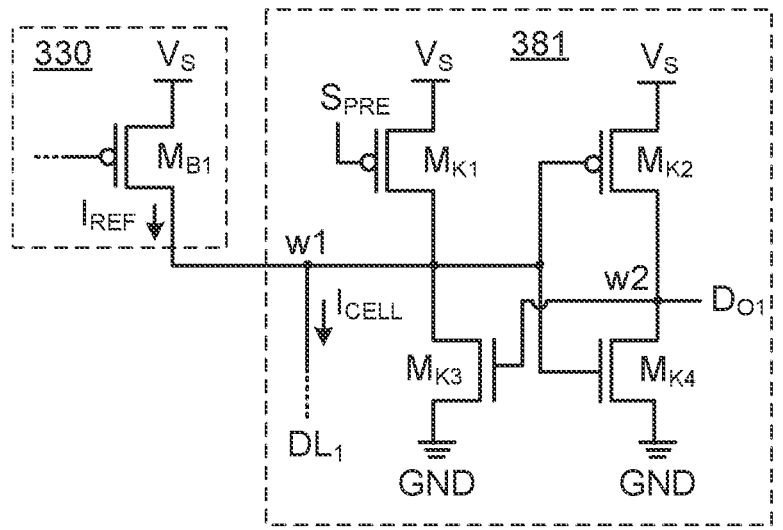
FIGS. 6A and 6B are schematic circuit diagrams illustrating two types of sense amplifiers used in the sensing circuit of the non-volatile memory according to the first embodiment of the present invention.
Figure 6B:
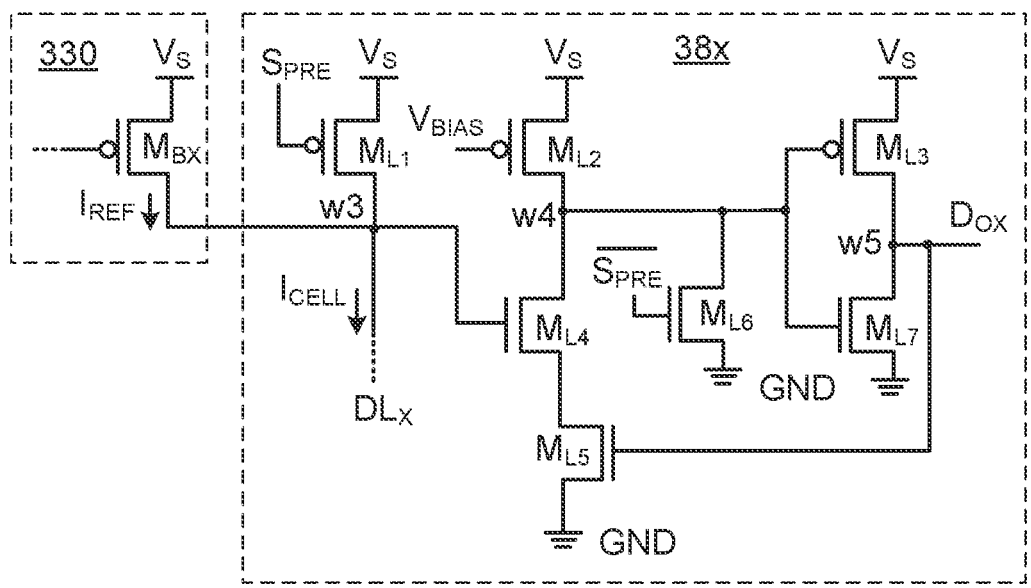

In the first embodiment, the sense amplifiers in the sensing circuit 390 of the non-volatile memory may have diverse types. FIGS. 6A and 6B are schematic circuit diagrams illustrating two types of sense amplifiers used in the sensing circuit of the non-volatile memory according to the first embodiment of the present invention. The structures of the sense amplifiers in the sensing circuit 390 are identical. For succinctness, only one sense amplifier will be described as follows.

As shown in FIG. 6A, the sense amplifier 381 comprises transistors $M_{K1}$~$M_{K4}$. The current mirroring terminal of the mirroring circuit 330 is connected with a node w1 of the sense amplifier 381. That is, the second drain/source terminal of the transistor $M_{B1}$ is connected with the node w1. The mirroring circuit 330 provides the reference current $I_{REF}$ to the sense amplifier 381. Moreover, the node w1 is coupled to the data line $DL_1$ to receive the memory current $I_{CELL}$ of the selected memory cell.

The first drain/source terminal of the transistor $M_{K1}$ receives the supply voltage $V_S$. The gate terminal of the transistor $M_{K1}$ receives a pre-charge signal $S_{PRE}$. The second drain/source terminal of the transistor $M_{K1}$ is connected with the node w1. The first drain/source terminal of the transistor $M_{K2}$ receives the supply voltage $V_S$. The gate terminal of the transistor $M_{K2}$ is connected with the node w1. The second drain/source terminal of the transistor $M_{K2}$ is connected with the node w2. The first drain/source terminal of the transistor $M_{K3}$ is connected with the node w1. The gate terminal of the transistor $M_{K3}$ is connected with the node w2. The second drain/source terminal of the transistor $M_{K3}$ is connected with the ground terminal GND. The first drain/source terminal of the transistor $M_{K4}$ is connected with the node w2. The gate terminal of the transistor $M_{K4}$ is connected with the node w1. The second drain/source terminal of the transistor $M_{K4}$ is connected with the ground terminal GND. Moreover, the voltage at the node w2 is the data signal $D_{O1}$.

Before a read cycle, the transistor $M_{K1}$ is turned on according to the pre-charge signal $S_{PRE}$. Consequently, the voltage at the node w1 is maintained at the supply voltage $V_S$. When the read cycle is started, the transistor $M_{K1}$ is turned off according to the pre-charge signal $S_{PRE}$. When the read cycle is ended, the transistor $M_{K1}$ is turned on again according to the pre-charge signal $S_{PRE}$. Consequently, the voltage at the node w1 is maintained at the supply voltage $V_S$. The rest may be deduced by analogy.

When the read cycle is started, if the reference current $I_{REF}$ is higher than the memory cell current $I_{CELL}$, the voltage at the node w1 is maintained at the supply voltage $V_S$. Consequently, the transistor $M_{K4}$ is turned on, and the transistor $M_{K2}$ is turned off. The voltage at the node w2 is the ground voltage (0V). Consequently, the transistor $M_{K3}$ is turned off. Moreover, when the read cycle is ended, the data signal $D_{O1}$ is the ground voltage, representing that the data signal $D_{O1}$ is in the low logic level state. In other words, the selected memory cell is in the off state.

When the read cycle is started, if the reference current $I_{REF}$ is lower than the memory cell current $I_{CELL}$, the voltage at the node w1 drops from the supply voltage $V_S$ to the ground voltage (0V). Consequently, the transistor $M_{K4}$ is turned off, and the transistor $M_{K2}$ is turned on. The voltage at the node w2 is the supply voltage $V_S$. Consequently, the transistor $M_{K3}$ is turned on. Moreover, when the read cycle is ended, the data signal $D_{O1}$ is the supply voltage $V_S$, representing that the data signal $D_{O1}$ is in the high logic level state. In other words, the selected memory cell is in the on state.

As mentioned above, the sense amplifier 381 shown in FIG. 6A can determine the storage state of the selected memory cell according to the relationship between the reference current $I_{REF}$ and the memory cell current $I_{CELL}$. Moreover, in the above sense amplifier 381, it will take a long time for the voltage at the node w1 to drop from the supply voltage $V_S$ to the ground voltage (0V). Consequently, the sensing speed cannot be increased.

As shown in FIG. 6B, the sense amplifier 38x comprises transistors $M_{L1}$~$K_{L7}$. The current mirroring terminal of the mirroring circuit 330 is connected with a node w3 of the sense amplifier 38x. That is, the second drain/source terminal of the transistor $M_{BX}$ is connected with the node w3. The mirroring circuit 330 provides the reference current $I_{REF}$ to the sense amplifier 38x. Moreover, the node w3 is further coupled to the data line $DL_X$ to receive the memory cell current $I_{CELL}$ of the selected memory cell.

The first drain/source terminal of the transistor $M_{L1}$ receives the supply voltage $V_S$. The gate terminal of the transistor $M_{L1}$ receives the pre-charge signal $S_{PRE}$. The second drain/source terminal of the transistor $M_{L1}$ is connected with the node w3. The first drain/source terminal of the transistor $M_{L2}$ receives the supply voltage $V_S$. The gate terminal of the transistor $M_{L2}$ receives a bias voltage VBIAS. The second drain/source terminal of the transistor $M_{L2}$ is connected with a node w4. The first drain/source terminal of the transistor $M_{L3}$ receives the supply voltage $V_S$. The gate terminal of the transistor $M_{L3}$ is connected with the node w4. The second drain/source terminal of the transistor $M_{L3}$ is connected with a node w5. The first drain/source terminal of the transistor $M_{L4}$ is connected with the node w4. The gate terminal of the transistor $M_{L4}$ is connected with the node w3. The first drain/source terminal of the transistor $M_{L5}$ is connected with the second drain/source terminal of the transistor $M_{L4}$. The gate terminal of the transistor $M_{L5}$ is connected with the node w5. The second drain/source terminal of the transistor $M_{L5}$ is connected with the ground terminal GND. The first drain/source terminal of the transistor $M_{L6}$ is connected with the node w4. The gate terminal of the transistor $M_{L6}$ receives an inverted pre-charge signal $\overline{S_{PRE}}$. The second drain/source terminal of the transistor $M_{L6}$ is connected with the ground terminal GND. The first drain/source terminal of the transistor $M_{L7}$ is connected with the node w5. The gate terminal of the transistor $M_{L7}$ is connected with the node w4. The second drain/source terminal of the transistor $M_{L7}$ is connected with the ground terminal GND. According to the bias voltage VBIAS, the transistor $M_{L2}$ is turned on to provide a current to the node w4. Moreover, the voltage at the node w5 is the data signal $D_{OX}$.

Before the read cycle, the transistor $M_{L1}$ is turned on according to the pre-charge signal $S_{PRE}$, and the transistor $M_{L6}$ is turned on according to the inverted pre-charge signal $\overline{S_{PRE}}$. Consequently, the voltage at the node w3 is maintained at the supply voltage $V_S$, and the voltage at the node w4 is maintained at the ground voltage (0V). When the read cycle is started, the transistor Mu is turned off according to the pre-charge signal $S_{PRE}$, and the transistor $M_{L6}$ is turned off according to the inverted pre-charge signal $\overline{S_{PRE}}$. When the read cycle is ended, the transistor Mu is turned on again according to the pre-charge signal $S_{PRE}$, and the transistor $M_{L6}$ is turned on according to the inverted pre-charge signal $\overline{S_{PRE}}$. Consequently, the voltage at the node w3 is maintained at the supply voltage $V_S$, and the voltage at the node w4 is maintained at the ground voltage (0V). The rest may be deduced by analogy.

When the read cycle is started, if the reference current $I_{REF}$ is higher than the memory cell current $I_{CELL}$, the voltage at the node w3 is maintained at the supply voltage $V_S$. The transistor $M_{L4}$ and the transistor $M_{L5}$ are turned on. The voltage at the node w4 is maintained at the ground voltage (0V). Consequently, the transistor $M_{L3}$ is turned on, and the transistor $M_{L7}$ is turned off. The voltage at the node w5 is the supply voltage $V_S$, and the transistor $M_{L5}$ is continuously turned on. When the read cycle is ended, the data signal $D_{OX}$ is the supply voltage $V_S$, representing that the data signal $D_{OX}$ is in the high logic level state. Consequently, the selected memory cell is in the off state.

When the read cycle is started, if the reference current $I_{REF}$ is lower than the memory cell current $I_{CELL}$, the voltage at the node w3 drops from the supply voltage $V_S$ to the ground voltage (0V). The transistor $M_{L4}$ is turned off, and the voltage at the node w4 is charged to the supply voltage $V_S$. The transistor Mo is turned off, and the transistor $M_{L7}$ is turned on. The voltage at the node w5 is the ground voltage (0V). Consequently, the transistor ML 5 is turned off. When the read cycle is ended, the data signal $D_{OX}$ is the ground voltage, representing that the data signal $D_{OX}$ is in the low logic level state. Consequently, the selected memory cell is in the on state.

As mentioned above, the sense amplifier 38x shown in FIG. 6B can determine the storage state of the selected memory cell according to the relationship between the reference current $I_{REF}$ and the memory cell current $I_{CELL}$. In the sense amplifier 38x, if the reference current $I_{REF}$ is lower than the memory cell current $I_{CELL}$, the slight reduction of the voltage at the node w3 may turn off the transistor $M_{L4}$. When the node w4 is charged from the ground voltage (0V), if the node w4 rises to the threshold voltage of the transistor $M_{L7}$, the transistor $M_{L7}$ can be turned on. Consequently, the data signal $D_{OX}$ is the ground voltage (i.e., in the low logic level state). In other words, in the sense amplifier 38x, it is not necessary to drop the voltage at the node w3 to the ground voltage (0V) and rise the voltage at the node w4 to the supply voltage $V_S$. Even so, the sense amplifier 38x can correctly generate the data signal $D_{OX}$, and the sensing speed of the sense amplifier 38x can be enhanced.

Figure 7:
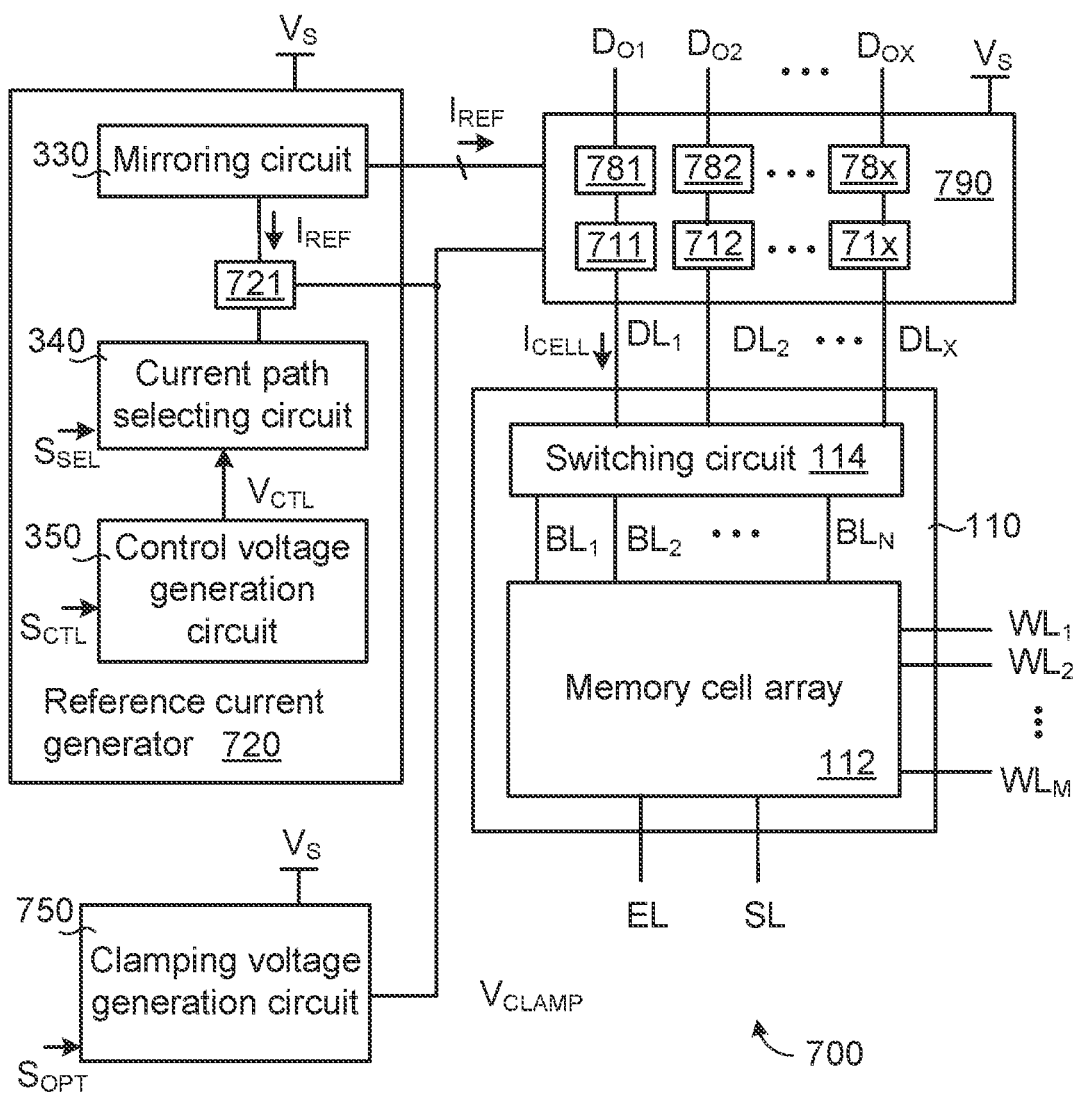
FIG. 7 is a schematic circuit diagram illustrating a non-volatile memory according to a second embodiment of the present invention.

FIG. 7 is a schematic circuit diagram illustrating a non-volatile memory according to a second embodiment of the present invention. In comparison with the non-volatile memory 300 shown in FIG. 3, the non-volatile memory 700 of the second embodiment further comprises a clamping circuit. The clamping circuit provides a clamping voltage $V_{CLAMP}$ to control the voltages on the data lines $D_{L1}$~$DL_X$. For succinctness, only the clamping circuit and the sensing circuit 790 are described as follows. The operations of the other circuits are similar to those of the non-volatile memory 300 of the first embodiment, and not redundantly described herein.

The clamping circuit comprises a clamping voltage generation circuit 750 and (X+1) clamping devices 711~71x and 721. The clamping voltage generation circuit 750 generates the clamping voltage $V_{CLAMP}$ to the clamping devices 711~71x and 721.

In this embodiment, the clamping voltage $V_{CLAMP}$ generated by the clamping voltage generation circuit 750 is changed according to the change of the supply voltage $V_S$. The clamping voltage generation circuit 750 receives an option signal $S_{OPT}$. In addition, the clamping voltage generation circuit 750 generates the clamping voltage Vamp according to the option signal $S_{OPT}$. When different supply voltage $V_S$ are provided to the non-volatile memory 700, the value of the clamping voltage $V_{CLAMP}$ is determined according to the option signal $S_{OPT}$.

The clamping device 721 is constructed in the reference current generator 720. The X clamping devices 711~71x are constructed in the sensing circuit 790. As shown in FIG. 3, the mirroring circuit 330 is directly connected with the reference current generator 340, and the sense amplifiers 381~38x are directly connected with the corresponding data lines $DL_1$~$DL_X$ In comparison with FIG. 3, the mirroring circuit 330 shown in FIG. 7 is coupled to the reference current generator 340 through the clamping device 721, and the sense amplifiers 781-78x are respectively coupled to the corresponding data lines $DL_1$~$DL_X$ through the clamping devices 711~71x. For example, the first terminal of the clamping device 711 is connected with the sense amplifier 781. The second terminal of the clamping device 711 is connected with the data line $DL_1$. The voltage on the data line $DL_1$ is controlled by the clamping device 711 according to the clamping voltage $V_{CLAMP}$. Moreover, the sense amplifiers 781-78x of the sensing circuit 790 may be implemented with the sense amplifiers shown in FIG. 6A or 6B.

Figure 8:
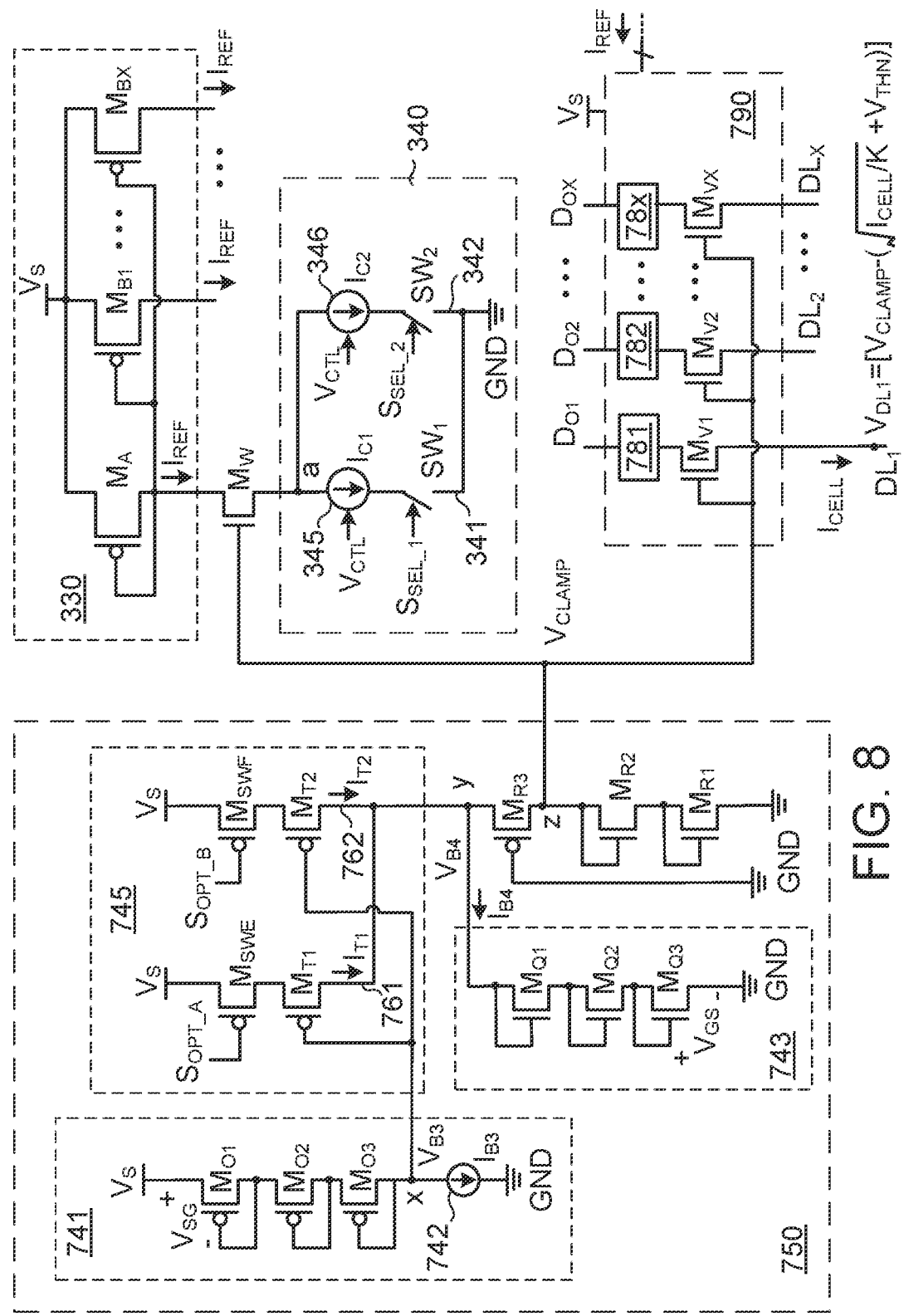
FIG. 8 is a schematic circuit diagram illustrating a clamping circuit in the non-volatile memory according to the second embodiment of the present invention.

FIG. 8 is a schematic circuit diagram illustrating a clamping circuit in the non-volatile memory according to the second embodiment of the present invention. The (X+1) clamping devices are respectively implemented with (X+1) transistors $M_{V1}$~$M_{VX}$ and $M_W$. The first drain/source terminal of the transistor $M_W$ is connected with the current input terminal of the mirroring circuit 330. The gate terminal of the transistor $M_W$ receives the clamping voltage $V_{CLAMP}$ The second drain/source terminal of the transistor $M_W$ is connected with the node a in the current path selecting circuit 340. Furthermore, take the transistor $M_{V1}$ for example. The first drain/source terminal of the transistor $M_{V1}$ is connected with the sense amplifier 781. The gate terminal of the transistor $M_{V1}$ receives the clamping voltage $V_{CLAMP}$. The second drain/source terminal of the transistor $M_{V1}$ is connected with the data line $DL_1$. When the gate terminal of the transistor $M_{V1}$ receives the clamping voltage $V_{CLAMP}$, the voltage on the data line $DL_1$ is clamped at $V_{DL1} = V_{CLAMP} - (\sqrt{I_{CELL}/K} + V_{THN})$ wherein $V_{THN}$ is the threshold voltage of the transistor Mai, K is a device parameter of the transistor $M_{V1}$, and $I_{CELL}$ is the cell current of the selected memory cell coupled to the data line $DL_1$. Similarly, the voltage at node a is approximately equal to $V_{DL1}$ when the two transistors $M_{V1}$ and $M_W$ are of the same size.

The clamping voltage generation circuit 750 comprises three transistors $M_{R1}$, $M_{R2}$, $M_{R3}$, two bias circuits 741, 743 and a current path selecting circuit 745.

The first drain/source terminal of the transistor $M_{R3}$ is connected with a node y. The gate terminal of the transistor $M_{R3}$ is connected with the ground terminal GND. The second drain/source terminal of the transistor $M_{R3}$ is connected with a node z. Similarly, the transistor $M_{R3}$ may be equivalently regarded as a resistor.

The diode-connected transistors $M_{R2}$ and $M_{R3}$ are serially connected between the node z and the ground terminal GND. That is, the first drain/source terminal of the transistor $M_{R2}$ is connected with the node z, the gate terminal of the transistor $M_{R2}$ is connected with the node z, the first drain/source terminal of the transistor $M_{R1}$ is connected with the second drain/source terminal of the transistor $M_{R2}$, the gate terminal of the transistor $M_{R1}$ is connected with the second drain/source terminal of the transistor $M_{R2}$, and the second drain/source terminal of the transistor $M_{R1}$ is connected with the ground terminal GND. Moreover, the voltage at the node z is the clamping voltage $V_{CLAMP}$.

The bias circuit 741 comprises three diode-connected transistors $M_{O1}$, $M_{O2}$, $M_{O3}$ and a current source 742. The diode-connected transistors $M_{O1}$, $M_{O2}$, $M_{O3}$ are serially connected between the supply voltage $V_S$ and a node x. That is, the first drain/source of the transistor $M_{O1}$ receives the supply voltage $V_S$, the gate terminal of the transistor $M_{O1}$ is connected with the second drain/source terminal of the transistor $M_{O1}$, the first drain/source terminal of the transistor $M_{O2}$ is connected with the second drain/source terminal of the transistor $M_{O1}$, the gate terminal of the transistor $M_{O2}$ is connected with the second drain/source of the transistor $M_{O2}$, the first drain/source terminal of the transistor $M_{O3}$ is connected with the second drain/source terminal of the transistor $M_{O2}$, the gate terminal of the transistor $M_{O3}$ is connected with the node x, and the second drain/source terminal of the transistor $M_{O3}$ is connected with the node x. The first terminal of the current source 742 is connected with the node x. The second terminal of the current source 742 is connected with the ground terminal GND. For example, the sizes of the transistors $M_{O1}$, $M_{O2}$ and $M_{O3}$ are identical. The current source 742 provides a bias current $I_{B3}$. Consequently, the bias voltage $V_{B3}$ at the node x is approximatively $V_S-3V_{SG}$, i.e., $V_{SG}=(\sqrt{I_{B3}/K_p}-V_{THP})$, wherein $V_{SG}$ is the voltage difference between the source terminal and the gate terminal of the transistor $M_{O1}$, $K_p$ is the device parameter of the transistor $M_{O1}$, and $V_{THP}$ is the threshold voltage of the transistor $M_{O1}$, and assume that the transistors $M_{O1}$ $M_{O2}$ and $M_{O3}$ have the same threshold voltage $V_{THP}$ in ideal. In addition, the threshold voltage $V_{THP}$ is negative.

The bias circuit 743 comprises three diode-connected transistors $M_{Q1}$, $M_{Q2}$ and $M_{Q3}$. The diode-connected transistors $M_{Q1}$, $M_{Q2}$, $M_{Q3}$ are serially connected between the node y and the ground terminal GND. That is, the first drain/source of the transistor $M_{Q1}$ is connected with the node y, the gate terminal of the transistor $M_{Q1}$ is connected with the node y, the first drain/source terminal of the transistor $M_{Q2}$ is connected with the second drain/source terminal of the transistor $M_{Q1}$, the gate terminal of the transistor $M_{Q2}$ is connected with the first drain/source of the transistor $M_{Q2}$, the first drain/source terminal of the transistor $M_{Q3}$ is connected with the second drain/source terminal of the transistor $M_{Q2}$, the gate terminal of the transistor $M_{Q3}$ is connected with the first drain/source of the transistor $M_{Q3}$, and the second drain/source terminal of the transistor $M_{Q3}$ is connected with the ground terminal GND. Moreover, the bias voltage $V_{B4}$ at the node y is determined according to the bias current $I_{B4}$. For example, the sizes of the transistors $M_{Q1}$, $M_{Q2}$ and $M_{Q3}$ are identical. Consequently, the bias voltage $V_{B4}$ at the node y is approximatively $3V_{GS}$, i.e., $V_{GS}=(\sqrt{I_{B4}/K_n}+V_{THN})$ wherein $V_{GS}$ is the voltage difference between the gate terminal and the source terminal of the transistor $M_{Q3}$, $K_n$ is the device parameter of the transistor $M_{Q3}$, and V THN is the threshold voltage of the transistor $M_{Q3}$, and assume that the transistors $M_{Q1}$ $M_{Q2}$ and $M_{Q3}$ have the same threshold voltage V THN in ideal. In addition, the threshold voltage V THN is positive.

The current path selecting circuit 745 comprises two current paths 761 and 762. According to the bias voltage $V_{B3}$, the current paths 761 and 762 generate corresponding voltage-controlled currents $I_{T1}$ and $I_{T2}$, respectively. The option signal Sop T is a two-bit signal. The two-bit signal contains option bits $S_{OPT\_A}$ and $S_{OPT\_B}$. The current path 761 is controlled according to the option bits $S_{OPT\_A}$. The current path 762 is controlled according to the option bits $S_{OPT\_B}$. In addition, at least one current path of the current path selecting circuit 745 is activated according to the option signal $S_{OPT}$.

In the current path selecting circuit 745, the transistors $M_{SWE}$ and $M_{SWF}$ are served as the switches, and the transistors $M_{T1}$ and $M_2$ are served as the voltage-controlled current sources. The first drain/source of the transistor $M_{SWE}$ receives the supply voltage $V_S$. The gate terminal of the transistor $M_{SWE}$ receives the option bit $S_{OPT\_A}$. The first drain/source terminal of the transistor $M_{T1}$ is connected with the second drain/source terminal of the transistor $M_{SWE}$. The gate terminal of the transistor $M_{T1}$ receives the bias voltage $V_{B3}$. The second drain/source terminal of the transistor $M_{T1}$ is connected with the node y.

The current path 762 of the current path selecting circuit 745 comprises the transistor $M_{T2}$ and the transistor $M_{SWF}$. The first drain/source terminal of the transistor $M_{SWF}$ receives the bias voltage $V_S$. The gate terminal of the transistor $M_{SWF}$ receives the option bit $S_{OPT\_B}$. The first drain/source terminal of the transistor $M_{T2}$ is connected with the second drain/source terminal of the transistor $M_{SWF}$. The gate terminal of the transistor $M_{T2}$ receives the bias voltage $V_{B3}$. The second drain/source terminal of the transistor $M_{T2}$ is connected with the node y.

In an embodiment, the size of the transistors $M_{T1}$ and $M_{T2}$ are different. Consequently, the voltage-controlled current $I_{T1}$ in the current path 761 and the voltage-controlled current $I_{T2}$ in the current path 762 are in a specified proportional relationship. For example, the size of the transistor $M_{T1}$ is larger than the size of the transistor $M_{T2}$. Consequently, the voltage-controlled current $I_{T1}$ is higher than the voltage-controlled current $I_{T2}$.

Moreover, according to the option signal $S_{OPT}$, at least one of the two switches $M_{SWE}$ and $M_{SWF}$ is controlled to be in a close state. For example, if the option bit $S_{OPT\_A}$ is in the logic level state "0", the transistor $M_{SWE}$ is turned on (i.e., in the close state), and the current path 761 is activated. Whereas, if the option bit $S_{OPT\_A}$ is in the logic level state "1", the transistor $M_{SWE}$ is turned off (i.e., in the open state), and the current path 761 is inactivated. For example, if the two option bits of the option bit $S_{OPT}<S_{OPT\_A}$, $S_{OPT\_B}>$ is <1, 0>, the current path 762 is activated, but the current path 761 is inactivated. In other words, the switches SWE and SWF are controlled to be in the close state or the open state according to the binary value of the option signal $S_{OPT}$.

In FIG. 8, the current path selecting circuit 745 comprises two current paths. In practice, the number of the current paths in the current path selecting circuit 745 is not restricted. The total number of the current paths in the current path selecting circuit 745 is equal to the number of the option bits in the option signal $S_{OPT}$.

As the supply voltage $V_S$ increases, the output current from the current path selecting circuit 745 results in the increase of the clamping voltage $V_{CLAMP}$. According to the option signal $S_{OPT}$, the current flowing into the node y is selectively adjusted. Consequently, when different supply voltage $V_S$ are provided to the non-volatile memory 700, the slope of the change of the clamping voltage $V_{CLAMP}$ is correspondingly adjusted according to the option signal $S_{OPT}$.

As mentioned above, the values of the control signal $S_{CTL}$ and the selection signal $S_{SEL}$ may be determined by the engineers according to the characteristics of the memory cells after the non-volatile memory 300 leaves the foundry. When a first value of control signal $S_{CTL}$ and a second value of selection signal $S_{SEL}$ are determined, the reference current $I_{REF}$ is changed at a first specified slope in a range of the supply voltage $V_S$. Similarly, a third value of the option signal $S_{OPT}$ is determined by the engineers. Consequently, the clamping voltage $V_{CLAMP}$ is changed at a second specified slope in a range of the supply voltage $V_S$. After the non-volatile memory 300 leaves the foundry, the sensing circuit 390 can correctly output the data signals $D_{O1}$~$D_{OX}$ according to the reference current $I_{REF}$. For example, the values of the control signal $S_{CTL}$ and the selection signal $S_{SEL}$ may be determined according to the characteristics of the on current $I_{ON}$ and the off current $I_{OFF}$ of the memory cell.

In the embodiment of FIG. 3, the memory cell in the memory cell array 112 has the structure of the MTP memory cell shown in FIG. 2A. It is noted that the type of the memory cell is not restricted. For example, in another embodiment, the memory cells in the memory cell array 112 are one-time programmable memory cells, which are also referred as OTP memory cells. In this case, the memory cell array 112 is not equipped with the erase line EL.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-volatile memory, comprising:
a memory module comprising plural data lines;
a sensing circuit coupled to the plural data lines of the memory module, wherein a first sense amplifier of the sensing circuit is coupled to a first data line of the plural data lines; and
a reference current generator receiving a supply voltage, wherein the reference current generator provides a reference current to the sensing circuit, and the reference current generator comprises:
a control voltage generation circuit receiving a control signal and generating a control voltage according to the control signal;
a first current path selecting circuit receiving a selection signal and the control voltage, wherein the first current path selecting circuit generates the reference current according to the control voltage and the selection signal; and
a mirroring circuit, wherein a current input terminal of the mirroring circuit receives the reference current, and a current mirroring terminal of the mirroring circuit is connected with the first sense amplifier, wherein in a first read cycle, the first sense amplifier determines a storage state of a selected memory cell according to a cell current in the first data line and the reference current,
wherein if the control signal is set as a first value, the reference current is changed at a first slope in a range of the supply voltage, wherein if the control signal is set as a second value, the reference current is changed at a second slope in the range of the supply voltage,
wherein the first value of the control signal is determined according to characteristics of an on current and an off current of the selected memory cell.

2. The non-volatile memory as claimed in claim 1, wherein the first current path selecting circuit comprises a first current path, and the first current path comprises a first voltage-controlled current source and a first switch, which are serially connected between the current input terminal of the mirroring circuit and a ground terminal, wherein the first switch is selectively in a close state or an open state according to a first selection bit of the selection signal, and the first voltage-controlled current source generates a first voltage-controlled current according to the control voltage, wherein when the first switch is in the close state, the reference current is equal to the first voltage-controlled current.

3. The non-volatile memory as claimed in claim 1, wherein the first current path selecting circuit comprises:
a first current path comprising a first voltage-controlled current source and a first switch, which are serially connected between the current input terminal of the mirroring circuit and a ground terminal; and
a second current path comprising a second voltage-controlled current source and a second switch, which are serially connected between the current input terminal of the mirroring circuit and the ground terminal,
wherein the first switch is selectively in a close state or an open state according to a first selection bit of the selection signal, the second switch is selectively in the close state or the open state according to a second selection bit of the selection signal, the first voltage-controlled current source generates a first voltage-controlled current according to the control voltage, and the second voltage-controlled current source generates a second voltage-controlled current according to the control voltage, wherein at least one of the first switch and the second switch is in the close state.

4. The non-volatile memory as claimed in claim 1, wherein the first current path selecting circuit comprises a first current path, and the first current path comprises:
a first transistor, wherein a first drain/source terminal of the first transistor is connected with the current input terminal of the mirroring circuit, and a gate terminal of the first transistor receives the control voltage; and
a second transistor, wherein a first drain/source terminal of the second transistor is connected with a second drain/source terminal of the first transistor, a gate terminal of the second transistor receives a first selection bit of the selection signal, and a second drain/source terminal of the second transistor is connected with a ground terminal,
wherein when the second transistor is in an on state according to the first selection bit of the selection signal, the first transistor generates a first voltage-controlled current according to the control voltage.

5. The non-volatile memory as claimed in claim 1, wherein the first current path selecting circuit comprises a first current path and a second current path, wherein the first current path comprises:
a first transistor, wherein a first drain/source terminal of the first transistor is connected with the current input terminal of the mirroring circuit, and a gate terminal of the first transistor receives the control voltage; and
a second transistor, wherein a first drain/source terminal of the second transistor is connected with a second drain/source terminal of the first transistor, a gate terminal of the second transistor receives a first selection bit of the selection signal, and a second drain/source terminal of the second transistor is connected with a ground terminal, wherein the second current path comprises:
a third transistor, wherein a first drain/source terminal of the third transistor is connected with the current input terminal of the mirroring circuit, and a gate terminal of the third transistor receives the control voltage;
a fourth transistor, wherein a first drain/source terminal of the fourth transistor is connected with the current input terminal of the mirroring circuit, a gate terminal of the fourth transistor receives the control voltage, and a second drain/source terminal of the fourth transistor is connected with a second drain/source terminal of the third transistor; and
a fifth transistor, wherein a first drain/source terminal of the fifth transistor is connected with the second drain/source terminal of the fourth transistor, a gate terminal of the fifth transistor receives a second selection bit of the selection signal, and a second drain/source terminal of the fifth transistor is connected with the ground terminal,
wherein the second transistor is selectively in an on state or an off state according to the first selection bit of the selection signal, the fifth transistor is selectively in the on state or the off state according to the second selection bit of the selection signal, the first transistor generates a first voltage-controlled current according to the control voltage, and the third transistor and the fourth transistor generate a second voltage-controlled current according to the control voltage, wherein at least one of the second transistor and the fifth transistor is in the on state.

6. The non-volatile memory as claimed in claim 1, wherein the control voltage generation circuit comprises:
a first bias circuit connected between the supply voltage and a ground terminal, wherein the first bias circuit generates a first bias voltage;
a second current path selecting circuit connected between the supply voltage and a first node, wherein the second current path selecting circuit receives the control signal and the first bias voltage, and generates a first current according to the supply voltage and the control signal;
a second bias circuit connected between the first node and the ground terminal, wherein the second bias circuit generates a second bias voltage and provides the second bias voltage to the first node;
a first resistor connected between the first node and a second node, wherein a voltage at the second node is the control voltage; and
a first transistor, wherein a first drain/source terminal of the first transistor is connected with the second node, a gate terminal of the first transistor is connected with the second node, and a second drain/source terminal of the first transistor is connected with the ground terminal.

7. The non-volatile memory as claimed in claim 6, wherein the first resistor is implemented by a second transistor, wherein a first drain/source terminal of the second transistor is connected with the first node, a gate terminal of the second transistor is connected with the ground terminal, and a second drain/source terminal of the second transistor is connected with the second node.

8. The non-volatile memory as claimed in claim 7, wherein the control voltage generation circuit further comprises a third current path selecting circuit, which is connected between the supply voltage and the second node, wherein the third current path selecting circuit receives the control signal, and the third current path selecting circuit generates a second current according to the supply voltage and the control signal.

9. The non-volatile memory as claimed in claim 8, wherein the third current path selecting circuit comprises:
a first current path comprising a second resistor and a first switch, which are serially connected between the supply voltage and the second node; and
a second current path comprising a third resistor and a second switch, which are serially connected between the supply voltage and the second node,
wherein the first switch is selectively in a close state or an open state according to a first control bit of the control signal, and the second switch is selectively in the close state or the open state according to a second control bit of the control signal.

10. The non-volatile memory as claimed in claim 8, wherein the third current path selecting circuit comprises:
a second transistor, wherein a first drain/source terminal of the second transistor receives the supply voltage, a gate terminal of the second transistor receives a first control bit of the control signal, and a second drain/source terminal of the second transistor is connected with the node;
a third transistor, wherein a first drain/source terminal of the third transistor receives the supply voltage, and a gate terminal of the third transistor receives a second control bit of the control signal; and
a fourth transistor, wherein a first drain/source terminal of the fourth transistor is connected with a second drain/source terminal of the third transistor, a gate terminal of the fourth transistor receives the second node, and a second drain/source terminal of the fourth transistor is connected with the second node,
wherein the second transistor is in an on state or an off state according to the first control bit of the control signal, and the third transistor is in the on state or the off state according to the second control bit of the control signal.

11. The non-volatile memory as claimed in claim 6, wherein the second current path selecting circuit comprises:
a first current path comprising a first voltage-controlled current source and a first switch, which are serially connected between the supply voltage and the first node; and
a second current path comprising a second voltage-controlled current source and a second switch, which are serially connected between the supply voltage and the first node,
wherein the first switch is selectively in a close state or an open state according to a first control bit of the control signal, the second switch is selectively in the close state or the open state according to a second control bit of the control signal, the first voltage-controlled current source generates a first voltage-controlled current according to the first bias voltage, and the second voltage-controlled current source generates a second voltage-controlled current according to the first bias voltage, wherein at least one of the first switch and the second switch is in the close state.

12. The non-volatile memory as claimed in claim 6, wherein the second current path selecting circuit comprises a first current path and a second current path, wherein the first current path comprises:
a second transistor, wherein a first drain/source terminal of the second transistor receives the supply voltage, and a gate terminal of the second transistor receives a first control bit of the control signal; and
a third transistor, wherein a first drain/source terminal of the third transistor is connected with a second drain/ source terminal of the second transistor, a gate terminal of the third transistor receives the first bias voltage, and a second drain/source terminal of the third transistor is connected with the first node, wherein the second current path comprises:

a fourth transistor, wherein a first drain/source terminal of the fourth transistor receives the supply voltage, and a gate terminal of the fourth transistor receives a second control bit of the control signal;

a fifth transistor, wherein a first drain/source terminal of the fifth transistor is connected with a second drain/source terminal of the fourth transistor, a gate terminal of the fifth transistor receives the first bias voltage, and a second drain/source terminal of the fifth transistor is connected with the first node, wherein the second transistor is selectively in an on state or an off state according to the first control bit of the control signal, the fourth transistor is selectively in the on state or the off state according to the second control bit of the control signal, the third transistor generates a first voltage-controlled current according to the first bias voltage, and the fifth transistor generates a second voltage-controlled current according to the first bias voltage, wherein at least one of the second transistor and the fourth transistor is in the on state.

13. The non-volatile memory as claimed in claim 6, wherein the first bias circuit comprises:

a second transistor, wherein a first drain/source terminal of the second transistor receives the supply voltage, and a gate terminal of the second transistor is connected with a second drain/source terminal of the second transistor;

a third transistor, wherein a first drain/source terminal of the third transistor is connected with the second drain/source terminal of the second transistor, a gate terminal of the third transistor is connected with a third node, and a second drain/source terminal of the third transistor is connected with the third node; and a first current source connected between the third node and the ground terminal, wherein a voltage at the third node is the first bias voltage.

14. The non-volatile memory as claimed in claim 6, wherein the second bias circuit comprises:

a second transistor, wherein a first drain/source terminal of the second transistor is connected with the first node, and a gate terminal of the second transistor is connected with the first node; and a third transistor, wherein a first drain/source terminal of the third transistor is connected with a second drain/source terminal of the second transistor, a gate terminal of the third transistor is connected with the second drain/source terminal of the second transistor, and a second drain/source terminal of the third transistor is connected with the ground terminal, wherein a voltage at the first node is the second bias voltage.

15. A non-volatile memory, comprising:

a memory module comprising plural data lines;

a sensing circuit coupled to the plural data lines of the memory module wherein a first sense amplifier of the sensing circuit is coupled to a first data line of the plural data lines; and a reference current generator receiving a supply voltage, wherein the reference current generator provides a reference current to the sensing circuit, and the reference current generator comprises:

a control voltage generation circuit receiving a control signal and generating a control voltage according to the control signal;

a first current path selecting circuit receiving a selection signal and the control voltage, wherein the first current path selecting circuit generates the reference current according to the control voltage and the selection signal; and a mirroring circuit, wherein a current input terminal of the mirroring circuit receives the reference current, and a current mirroring terminal of the mirroring circuit is connected with the first sense amplifier, wherein in a first read cycle, the first sense amplifier determines a storage state of a selected memory cell according to a cell current in the first data line and the reference current, wherein the control voltage generation circuit comprises:

a first bias circuit connected between the supply voltage and a ground terminal, wherein the first bias circuit generates a first bias voltage;

a second current path selecting circuit connected between the supply voltage and a first node, wherein the second current path selecting circuit receives the control signal and the first bias voltage, and generates a first current according to the supply voltage and the control signal;

a second bias circuit connected between the first node and the ground terminal, wherein the second bias circuit generates a second bias voltage and provides the second bias voltage to the first node;

a first resistor connected between the first node and a second node wherein a voltage at the second node is the control voltage; and a first transistor, wherein a first drain/source terminal of the first transistor is connected with the second node, a gate terminal of the first transistor is connected with the second node, and a second drain/source terminal of the first transistor is connected with the ground terminal, wherein if the control signal is set as a first value, the reference current is changed at a first slope in a range of the supply voltage, wherein if the control signal is set as a second value, the reference current is changed at a second slope in the range of the supply voltage.

16. The non-volatile memory as claimed in claim 15, wherein the first sense amplifier comprises:

a first transistor, wherein a first drain/source terminal of the first transistor receives the supply voltage, a gate terminal of the first transistor receives a pre-charge signal, a second drain/source terminal of the first transistor is connected with a first node, the current mirroring terminal of the mirroring circuit is connected with first node, and the first data line is coupled to the first node;

a second transistor, wherein a first drain/source terminal of the second transistor is connected with the first node, a gate terminal of the second transistor is connected with a second node, a second drain/source terminal of the second transistor is connected with a ground terminal, and a voltage at the second node a data signal;

a third transistor, wherein a first drain/source terminal of the third transistor receives the supply voltage, a gate terminal of the third transistor is connected with the first node, and a second drain/source terminal of the third transistor is connected with the second node; and a fourth transistor, wherein a first drain/source terminal of the fourth transistor is connected with the second node, a gate terminal of the fourth transistor is connected with the first node, and a second drain/source terminal of the fourth transistor is connected with the ground terminal.

17. The non-volatile memory as claimed in claim 15, wherein the first sense amplifier comprises:
a first transistor, wherein a first drain/source terminal of the first transistor receives the supply voltage, a gate terminal of the first transistor receives a pre-charge signal, a second drain/source terminal of the first transistor is connected with a first node, the current mirroring terminal of the mirroring circuit is connected with first node, and the first data line is coupled to the first node;
a second transistor, wherein a first drain/source terminal of the second transistor receives the supply voltage, a gate terminal of the second transistor receives a bias voltage, and a second drain/source terminal of the second transistor is connected with a second node;
a third transistor, wherein a first drain/source terminal of the third transistor receives the supply voltage, a gate terminal of the third transistor is connected with the second node, a second drain/source terminal of the third transistor is connected with a third node, and a voltage at the third node is a data signal;
a fourth transistor, wherein a first drain/source terminal of the fourth transistor is connected with the second node, and a gate terminal of the fourth transistor is connected with the first node;
a fifth transistor, wherein a first drain/source terminal of the fifth transistor is connected with a second drain/source terminal of the fourth transistor, a gate terminal of the fifth transistor is connected with the third node, and a second drain/source terminal of the fifth transistor is connected with a ground terminal;
a sixth transistor, wherein a first drain/source terminal of the sixth transistor is connected with the second node, a gate terminal of the sixth transistor receives an inverted pre-charge signal, and a second drain/source terminal of the sixth transistor is connected with the ground terminal; and
a seventh transistor, wherein a first drain/source terminal of the seventh transistor is connected with the third node, a gate terminal of the seventh transistor is connected with the second node, and a second drain/source terminal of the seventh transistor is connected with the ground terminal.

18. A non-volatile memory, comprising:
a memory module comprising plural data lines;
a sensing circuit coupled to the plural data lines of the memory module, wherein a first sense amplifier of the sensing circuit is coupled to a first data line of the plural data lines;
a first clamping device, wherein the first sense amplifier is coupled to the first data line through the first clamping device; and
a reference current generator receiving a supply voltage, wherein the reference current generator provides a reference current to the sensing circuit, and the reference current generator comprises:
a control voltage generation circuit receiving a control signal and generating a control voltage according to the control signal;
a first current path selecting circuit receiving a selection signal and the control voltage, wherein the first current path selecting circuit generates the reference current according to the control voltage and the selection signal; and
a mirroring circuit, wherein a current input terminal of the mirroring circuit receives the reference current, and a current mirroring terminal of the mirroring circuit is connected with the first sense amplifier, wherein in a first read cycle, the first sense amplifier determines a storage state of a selected memory cell according to a cell current in the first data line and the reference current,
wherein if the control signal is set as a first value, the reference current is changed at a first slope in a range of the supply voltage, wherein if the control signal is set as a second value, the reference current is changed at a second slope in the range of the supply voltage.

19. The non-volatile memory as claimed in claim 18, further comprising a second clamping device, wherein the current input terminal of the mirroring circuit is coupled to the first current path selecting circuit through the second clamping device.

20. The non-volatile memory as claimed in claim 18, wherein the first clamping device comprises a first transistor, wherein a first drain/source terminal of the first transistor is connected with the first sense amplifier, a second drain/source terminal of the first transistor is connected with the first data line, and a gate terminal of the first transistor is connected with a clamping voltage generation circuit to receive a clamping voltage.

21. The non-volatile memory as claimed in claim 20, wherein the clamping voltage generation circuit comprises:
a first bias circuit connected between the supply voltage and a ground terminal, wherein the first bias circuit generates a first bias voltage;
a second current path selecting circuit connected between the supply voltage and a first node, wherein the second current path selecting circuit receives an option signal and the first bias voltage, and generates a first current;
a second bias circuit connected between the supply voltage and the ground terminal, wherein the second bias circuit generates a second bias voltage and provides the second bias voltage to the first node;
a first resistor connected between the first node and a second node, wherein a voltage at the second node is the clamping voltage;
a second transistor, wherein a first drain/source terminal of the second transistor is connected with the second node, and a gate terminal of the second transistor is connected with the second node; and
a third transistor, wherein a first drain/source terminal of the third transistor is connected with a second drain/source terminal of the second transistor, a gate terminal of the third transistor is connected with the second drain/source terminal of the second transistor, and a second drain/source terminal of the third transistor is connected with the ground terminal.

22. The non-volatile memory as claimed in claim 21, wherein the first resistor is implemented by a fourth transistor, wherein a first drain/source terminal of the fourth transistor is connected with the first node, a gate terminal of the fourth transistor is connected with the ground terminal, and a second drain/source terminal of the fourth transistor is connected with the second node.

23. The non-volatile memory as claimed in claim 21, wherein the second current path selecting circuit comprises:
a first current path comprising a first voltage-controlled current source and a first switch, which are serially connected between the supply voltage and the first node; and a second current path comprising a second voltage-controlled current source and a second switch, which are serially connected between the supply voltage and the first node, wherein the first switch is selectively in a close state or an open state according to a first option bit of the option signal, the second switch is selectively in the close state or the open state according to a second option bit of the option signal, the first voltage-controlled current source generates a first voltage-controlled current according to the first bias voltage, and the second voltage-controlled current source generates a second voltage-controlled current according to the first bias voltage, wherein at least one of the first switch and the second switch is in the close state.

24. The non-volatile memory as claimed in claim 21, wherein the second current path selecting circuit comprises a first current path and a second current path, wherein the first current path comprises:
 a fourth transistor, wherein a first drain/source terminal of the fourth transistor receives the supply voltage, and a gate terminal of the fourth transistor receives a first option bit of the option signal; and
 a fifth transistor, wherein a first drain/source terminal of the fifth transistor is connected with a second drain/source terminal of the fourth transistor, a gate terminal of the fifth transistor receives the first bias voltage, and a second drain/source terminal of the fifth transistor is connected with the first node, wherein the second current path comprises:
 a sixth transistor, wherein a first drain/source terminal of the sixth transistor receives the supply voltage, and a gate terminal of the sixth transistor receives a second option bit of the option signal;
 a seventh transistor, wherein a first drain/source terminal of the seventh transistor is connected with a second drain/source terminal of the sixth transistor, a gate terminal of the seventh transistor receives the first bias voltage, and a second drain/source terminal of the seventh transistor is connected with the first node, wherein the fourth transistor is selectively in an on state or an off state according to the first option bit of the option signal, the sixth transistor is selectively in the on state or the off state according to the second option bit of the option signal, the fifth transistor generates a first voltage-controlled current according to the first bias voltage, and the seventh transistor generates a second voltage-controlled current according to the first bias voltage, wherein at least one of the fourth transistor and the sixth transistor is in the on state.

25. The non-volatile memory as claimed in claim 21, wherein the first bias circuit comprises:
 a fourth transistor, wherein a first drain/source terminal of the fourth transistor receives the supply voltage, and a gate terminal of the fourth transistor is connected with a second drain/source terminal of the fourth transistor;
 a fifth transistor, wherein a first drain/source terminal of the fifth transistor is connected with the second drain/source terminal of the fourth transistor, and a gate terminal of the fifth transistor is connected with a second drain/source terminal of the fifth transistor;
 a sixth transistor, wherein a first drain/source terminal of the sixth transistor is connected with the second drain/source terminal of the fifth transistor, a gate terminal of the sixth transistor is connected with a third node, and a second drain/source terminal of the sixth transistor is connected with the third node; and
 a first current source connected between the third node and the ground terminal, wherein a voltage at the third node is the first bias voltage.

26. The non-volatile memory as claimed in claim 21, wherein the second bias circuit comprises:
 a fourth transistor, wherein a first drain/source terminal of the fourth transistor is connected with the first node, and a gate terminal of the fourth transistor is connected with the first node;
 a fifth transistor, wherein a first drain/source terminal of the fifth transistor is connected with a second drain/source terminal of the fourth transistor, and a gate terminal of the fifth transistor is connected with the second drain/source terminal of the fourth transistor; and
 a sixth transistor, wherein a first drain/source terminal of the sixth transistor is connected with a second drain/source terminal of the fifth transistor, a gate terminal of the sixth transistor is connected with the second drain/source terminal of the fifth transistor, and a second drain/source terminal of the sixth transistor is connected with the ground terminal, wherein a voltage at the first node is the second bias voltage.

* * * * *